(12) United States Patent
Moulik et al.

(10) Patent No.: US 10,369,855 B2
(45) Date of Patent: Aug. 6, 2019

(54) GAS SPRING AND GAS DAMPER ASSEMBLIES, SUSPENSION SYSTEMS AND METHODS

(71) Applicant: Firestone Industrial Products Company, LLC, Indianapolis, IN (US)

(72) Inventors: Pradipta N. Moulik, Carmel, IN (US); Joshua R. Leonard, Noblesville, IN (US); Graham R. Brookes, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/024,018

(22) PCT Filed: Oct. 28, 2014

(86) PCT No.: PCT/US2014/062595
§ 371 (c)(1),
(2) Date: Mar. 22, 2016

(87) PCT Pub. No.: WO2015/065989
PCT Pub. Date: May 7, 2015

(65) Prior Publication Data
US 2016/0236532 A1    Aug. 18, 2016

Related U.S. Application Data

(60) Provisional application No. 61/896,547, filed on Oct. 28, 2013.

(51) Int. Cl.
*F16F 9/34* (2006.01)
*B60G 15/12* (2006.01)
(Continued)

(52) U.S. Cl.
CPC ......... *B60G 15/12* (2013.01); *B60G 17/0485* (2013.01); *B60G 17/0521* (2013.01);
(Continued)

(58) Field of Classification Search
CPC .......... F16F 9/0472; F16F 9/049; F16F 9/057; B60G 17/0485
See application file for complete search history.

(56) References Cited

U.S. PATENT DOCUMENTS 2,926,011 A * 2/1960 Slemmons ............. B60G 11/27
267/64.27
3,212,769 A * 10/1965 Ishibashi ............... B60G 15/12
137/195
(Continued)

FOREIGN PATENT DOCUMENTS

DE    102010045563    3/2012
EP    0166702         1/1986
GB    1068167         5/1967

OTHER PUBLICATIONS

Machine translation of DE 10 2010045563, generated Dec. 9, 2017.*
(Continued)

*Primary Examiner* — Bradley T King
(74) *Attorney, Agent, or Firm* — Brian D. McAlhaney; Fay Sharpe LLP

(57) ABSTRACT

A gas spring and gas damper assembly (AS1) includes a first end member (300) and a second end member (400) that is spaced from the first end member (300). A flexible spring member (200) is secured between the first (300) and second (400) end members and at least partially defines a spring chamber (202) therebetween. A first damper reservoir (322) has a substantially-fixed volume. An elongated gas damping passage (306) is connected in fluid communication between the spring chamber (202) and the first damper reservoir
(Continued)

(322). A suspension system including such a gas spring and gas damper assembly as well as a method of assembly are also included.

20 Claims, 15 Drawing Sheets

(51) Int. Cl.
*F16F 9/04* (2006.01)
*B60G 17/048* (2006.01)
*B60G 17/052* (2006.01)
*F16F 9/05* (2006.01)

(52) U.S. Cl.
CPC ............ *F16F 9/049* (2013.01); *F16F 9/0472* (2013.01); *F16F 9/05* (2013.01); *B60G 2202/32* (2013.01); *B60G 2500/10* (2013.01); *F16F 2228/066* (2013.01)

(56) References Cited

U.S. PATENT DOCUMENTS

| | | | |
|---|---|---|---|
| 4,506,910 A | | 3/1985 | Bierens |
| 5,111,735 A | * | 5/1992 | Johnson ............... B60G 17/052 91/433 |
| 5,374,077 A | * | 12/1994 | Penzotti ................ B60G 11/30 267/123 |
| 5,954,316 A | | 9/1999 | Voss |
| 6,312,006 B1 | | 11/2001 | Svensson |
| 7,942,427 B2 | | 5/2011 | Lloyd |
| 8,123,202 B2 | | 2/2012 | Eise |
| 8,540,222 B2 | | 9/2013 | Westnedge |
| 8,801,016 B2 | | 8/2014 | Leonard |
| 9,140,327 B2 | | 9/2015 | Hart |
| 2004/0032065 A1 | | 2/2004 | Leonard |
| 2006/0226586 A1 | | 10/2006 | Levy |
| 2007/0114706 A1 | | 5/2007 | Myers |
| 2008/0284072 A1 | | 11/2008 | Hayes |
| 2009/0057967 A1 | | 3/2009 | Koeske |
| 2011/0049774 A1 | * | 3/2011 | Naber .................. F16F 9/0472 267/64.27 |
| 2014/0300075 A1 | * | 10/2014 | Delorenzis ............ B60G 11/30 280/124.159 |
| 2014/0345450 A1 | * | 11/2014 | Leonard ................ B60G 11/28 92/143 |
| 2016/0121682 A1 | | 5/2016 | Leonard |
| 2016/0298712 A1 | * | 10/2016 | Weber .................... F16F 9/049 |
| 2017/0151848 A1 | | 6/2017 | Delorenzis |
| 2017/0248187 A1 | * | 8/2017 | Leonard ................ F16F 9/049 |
| 2017/0363169 A1 | * | 12/2017 | Bounds ................ B60G 11/27 |

OTHER PUBLICATIONS

International Search Report and Written Opinion for corresponding patent application No. PCT/US2014/062595 dated Jan. 23, 2015.

* cited by examiner

STIFFNESS VERSUS FREQUENCY

— Pipe-Storage
-- Pipe-Loss

STIFFNESS VERSUS FREQUENCY

— Pipe-Storage
-- Pipe-Loss

GAS SPRING AND GAS DAMPER ASSEMBLIES, SUSPENSION SYSTEMS AND METHODS

This application claims priority from U.S. Provisional Patent Application No. 61/896,547 filed on Oct. 28, 2013, which is hereby incorporated herein by reference in its entirety.

BACKGROUND

The subject matter of the present disclosure broadly relates to the art of gas spring devices and, more particularly, to gas spring and gas damper assemblies that are capable of providing pressurized gas damping through the use of one or more elongated gas damping passages. In some cases, such pressurized gas damping can be tuned to provide pressurized gas damping within two or more frequency ranges. Suspension systems including one or more of such gas spring and gas damper assemblies as well as methods of manufacture are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and gas damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Generally, it is possible to reduce the spring rate of gas springs, thereby improving ride comfort, by increasing the volume of pressurized gas operatively associated with the gas spring. This is commonly done by placing an additional chamber, cavity or volume filled with pressurized gas into fluid communication with the primary spring chamber of the gas spring.

Additionally, the one or more damping elements can, in some cases, be of a type and kind that utilize gaseous fluid rather than liquid as the working medium. In known constructions, the pressurized gas damping element can permit gas flow between two or more volumes of pressurized gas, such as through one or more orifices or through one or more valve ports. Generally, there is some resistance to the movement of pressurized gas through these passages or ports. This resistance acts to dissipate energy associated with gas springs and/or suspension systems, and thereby provide some measure of damping.

However, various disadvantages exist with known gas spring constructions that include additional gas volumes to assist in reducing the spring rate of the gas spring, and at least some of these disadvantages involve the movement of air between the two volumes. That is, the flow of pressurized gas between the two volumes is at least partially dependent upon the size, length, shape and number of fluid pathways connecting the two volumes. It will be appreciated that one or more, very large, fluid-communication pathways would permit increased quantities of pressurized gas to flow between the two volumes. However, such pathways would provide reduced resistance to gas flow and, thus, provide minimal or at least decreased damping characteristics. What's more, such very large pathways are often difficult to provide, given the limited operating and mounting envelopes normally associated with vehicle suspension systems.

Increased damping performance can, in some cases, be achieved by reducing the size, increasing the length, altering the shape and/or reducing the number of fluid pathways between the two volumes. Such alterations would, however, normally provide increased damping performance at the expense of other performance characteristics of the gas spring and gas damper assemblies. That is, the changes that increase the resistance to flow through the passages and, thus, increase damping performance will typically also decrease the effectiveness of the additional gas volume in reducing the spring rate of the gas spring.

Notwithstanding the overall success of known constructions, certain disadvantages may still exist that could be limiting to broader adoption and/or use of gas spring devices. Accordingly, it is believed desirable to develop gas spring devices that overcome the foregoing and/or other problems and/or disadvantages of known designs, and/or otherwise advance the art of gas spring devices.

BRIEF DESCRIPTION

One example of a gas spring and gas damper assembly in accordance with the subject matter of the present disclosure can include a first end member and a second end member. A flexible spring member can be secured between the first and second end members such that a spring chamber is at least partially defined by the flexible spring member between the first and second end members. The assembly can also include a first damper reservoir having a substantially fixed volume, and an elongated gas damping passage extending in fluid communication between the spring chamber and the first damper reservoir. The elongated gas damping passage can be dimensioned to generate pressurized gas damping of vibrations across a first range of frequencies. In some cases, the elongated gas damping passage can take the form of a length of conduit having a generally tubular form. In some cases, the length of conduit can be configured to include one or more helical loops or coils. In some cases, the elongated passage can have an approximately circular cross-sectional shape, an approximately elliptical cross-sectional shape and/ or approximately ovoid cross-sectional shape along at least a portion of the length thereof.

Additionally, a gas spring and gas damper assembly in accordance with the subject matter of the present disclosure can include a first flow control system that is fluidically connected between the spring chamber and the first damper reservoir. The first flow control system can be operative to selectively permit pressurized gas flow between the spring chamber and the first damper reservoir. The first flow control system can be cooperative with the first damper reservoir to generate pressurized gas damping of vibrations across a second range of frequencies that is different from the first range of frequencies associated with the elongated gas damping passage.

Furthermore, or in the alternative, a gas spring and gas damper assembly in accordance with the subject matter of the present disclosure can include a second damper reservoir having a substantially fixed volume. In such case, the first flow control system or a second flow control system can be fluidically connected between the spring chamber and the second damper reservoir. In such case, the first or second flow control system can be operative to selectively permit pressurized gas flow between the spring chamber and the second damper reservoir, and can be cooperative with the second damper reservoir to generate pressurized gas damping of vibrations across the second range of frequencies or a third range of frequencies, which is different from the first and second ranges of frequencies.

One example of a suspension system in accordance with the subject matter of the present disclosure can include a pressurized gas system, and at least one gas spring and gas damper assembly according to any one of the foregoing three paragraphs with at least the spring chamber thereof in fluid communication with the pressurized gas system.

One example of a method of manufacturing a gas spring and gas damper assembly in accordance with the subject matter of the present disclosure can include providing a flexible wall and forming a spring chamber from at least a portion of the flexible wall. The method can also include providing a first damper reservoir having a substantially fixed volume. The method can further include providing an elongated gas damping passage dimensioned to generate pressurized gas damping of vibrations across a first range of frequencies. The method can also include operatively connecting the elongated gas damping passage in fluid communication between the spring chamber and the first damper reservoir.

In some cases, the method can further include providing a flow control system and connecting the flow control system in fluid communication between the spring chamber and the first damper reservoir or a second damper reservoir. The flow control system being operative to selectively permit pressurized gas flow between the spring chamber and the damper reservoir, and cooperative with the damper reservoir to generate pressurized gas damping of vibrations across a second range of frequencies that is different from the first range of frequencies.

DETAILED DESCRIPTION

Figure 1:
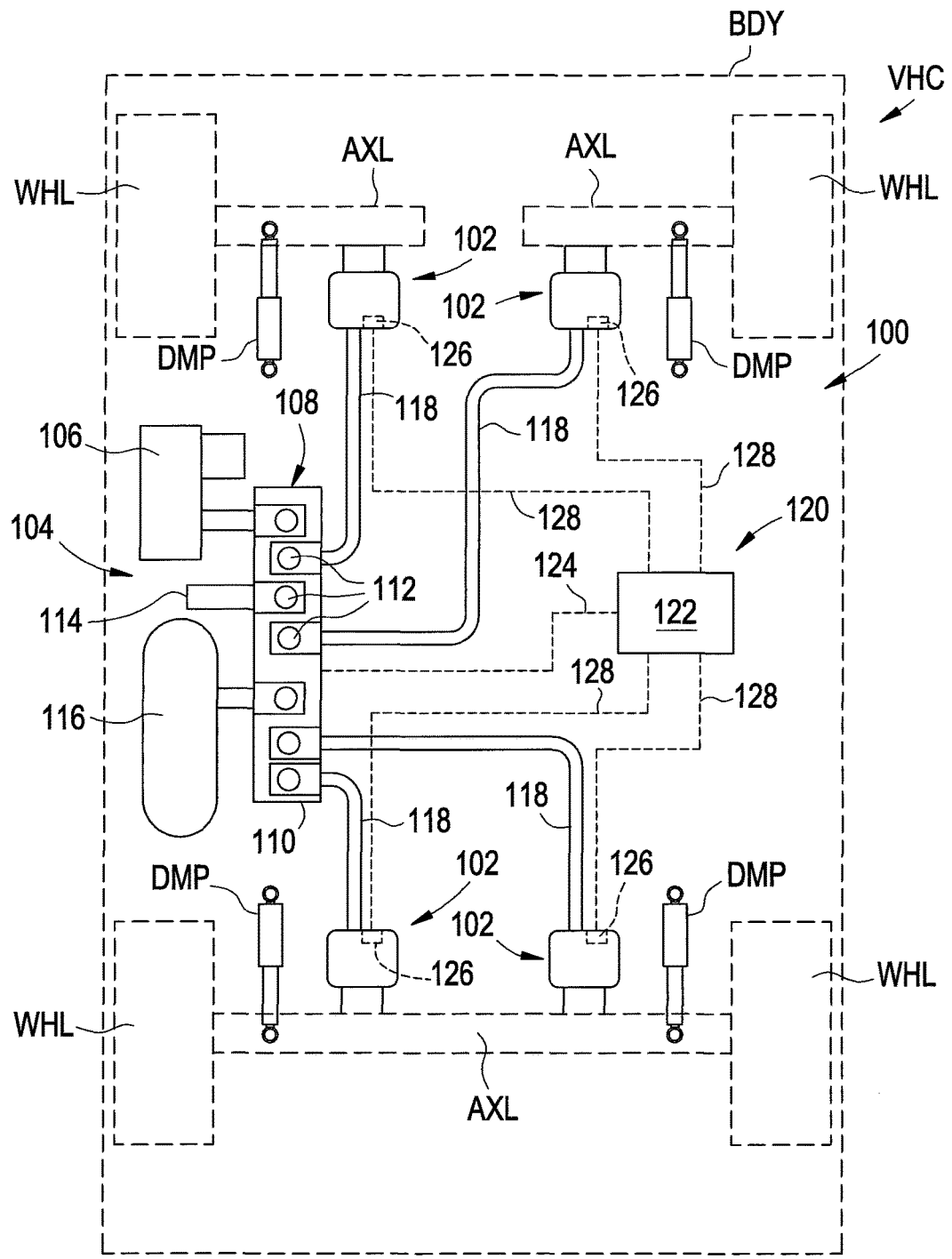
FIG. 1 is a schematic representation of one example of a suspension system of an associated vehicle that includes one or more gas spring and gas damper assemblies in accordance with the subject matter of the present disclosure.

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purpose of clarity and ease of understanding.

A gas spring and gas damper assembly in accordance with the subject matter of the present disclosure can include at least one end member and a flexible wall secured to the end member that at least partially defines a spring chamber having a pressurized gas volume that can vary during certain conditions of use. Such a gas spring and gas damper assembly can also include at least one additional pressurized gas reservoir that is internal to the gas spring and gas damper assembly but separate or otherwise fluidically dissociated from the spring chamber. The additional pressurized gas reservoir can have a pressurized gas volume that is substantially fixed in comparison with the pressurized gas volume of the spring chamber. A gas spring and gas damper assembly in accordance with the subject matter of the present disclosure can also include an elongated gas damping passage in fluid communication between the spring chamber and the additional pressurized gas reservoir. In some cases, the elongated gas damping passage can be tuned or otherwise operative to generate pressurized gas damping of vibrations at a targeted frequency or across a targeted range of frequencies.

Additionally, in some cases, a gas spring and gas damper assembly in accordance with the subject matter of the present disclosure can include a control device disposed in fluid communication between the spring chamber and the additional pressurized gas reservoir. In some cases, the control device can be disposed in fluid communication along the elongated gas damping passage (i.e., in series with the elongated damping passage). Additionally, or in the alternative, the control device can be disposed in fluid communication between the spring chamber and the additional pressurized gas reservoir separately from the elongated gas damping passage (i.e., in parallel with the elongated damping passage). In either of such cases, the control device can be tuned or otherwise operative to generate pressurized gas damping of vibrations across another, different targeted frequency or range of frequencies than that associate with the elongated gas damping passage alone.

Furthermore, in some cases, at least two additional pressurized gas reservoirs can be used that are internal to the gas spring and gas damper assembly and also separate from or otherwise fluidically dissociated from the spring chamber and from one another. In such cases, the elongated gas damping passage can be a first elongated gas damping passage that is disposed in fluid communication between the spring chamber and one of the at least two pressurized gas reservoirs. And, an additional elongated gas damping passage and/or one or more control devices can, optionally, be disposed in fluid communication between the spring chamber and another one of the at least two pressurized gas reservoirs. In such cases, the additional elongated gas damping passage and/or one or more control devices can be tuned or otherwise operative to generate pressurized gas damping of vibrations across another, different targeted frequency or range of frequencies than that associated with the first elongated gas damping passage alone.

Further still, in some cases, a gas spring and gas damper assembly in accordance with the subject matter of the present disclosure can include two or more additional pressurized gas reservoirs that are internal to the gas spring and gas damper assembly and also separate from or otherwise fluidically dissociated from the spring chamber and from one another. A gas spring and gas damper assembly in accordance with the subject matter of the present disclosure can also include an elongated gas damping passage in fluid communication between the spring chamber and one of the two or more additional pressurized gas reservoirs. Additionally, a plurality of control devices can, optionally, be provided with at least one control device fluidically associated with each of the two or more pressurized gas reservoirs. One or more of the plurality of control devices can be adapted to selectively permit pressurized gas flow between the spring chamber and a corresponding one of the pressurized gas volumes. In some cases, a combination of a control device and a corresponding one pressurized gas volume can be tuned to generate pressurized gas damping of vibrations at a target frequency or across a targeted frequency range. In a preferred arrangement, the targeted frequency or range of frequencies can be different from one another and different from the targeted frequency or range of frequencies of the elongated gas damping passage.

In some cases, a suspension system can include one or more gas spring and gas damper assemblies in accordance with the subject matter of the present disclosure. FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

The suspension system can also include a plurality of gas spring and gas damper assemblies supported between the sprung and unsprung masses of the associated vehicle. In the arrangement shown in FIG. 1, suspension system 100 includes four gas spring and gas damper assemblies 102, one of which is disposed toward each corner of the associated vehicle adjacent a corresponding wheel WHL. However, it will be appreciated that any other suitable number of gas spring and gas damper assemblies could alternately be used in any other configuration and/or arrangement. As shown in FIG. 1, gas spring and gas damper assemblies 102 are supported between axles AXL and body BDY of associated vehicle VHC. Additionally, it will be recognized that the gas spring and gas damper assemblies shown and described in FIG. 1 (e.g., gas spring and gas damper assemblies 102) are illustrated as being of a rolling lobe-type construction. It is to be understood, however, that gas spring and gas damper assemblies of other types, kinds and/or constructions could alternately be used.

Depending on desired performance characteristics and/or other factors, the suspension system may, in some cases, also include damping members, such as dampers DMP, for example, of a typical construction that are provided separately from gas spring and gas damper assemblies 102 and secured between the sprung and unsprung masses in a conventional manner. In a preferred arrangement, however, gas spring and gas damper assemblies 102 can be sized, configured and operative to provide the desired performance characteristics for the suspension system without the use of additional damping members (e.g., conventional struts or shock absorbers) that are separately provided.

Suspension system 100 also includes a pressurized gas system 104 operatively associated with the gas spring and gas damper assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also, optionally, include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring and gas damper assemblies 102 through suitable gas transfer lines 118. As such, pressurized gas can be selectively transferred into and/or out of the gas spring and gas damper assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring and gas damper assemblies 102. Controller 122 can be of any suitable type, kind and/or configuration.

Control system 120 can also, optionally, include one or more height (or distance) sensing devices 126, such as, for example, may be operatively associated with the gas spring and gas damper assemblies and capable of outputting or otherwise generating data, signals and/or other communications having a relation to a height of the gas spring and gas damper assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction.

Figure 2:
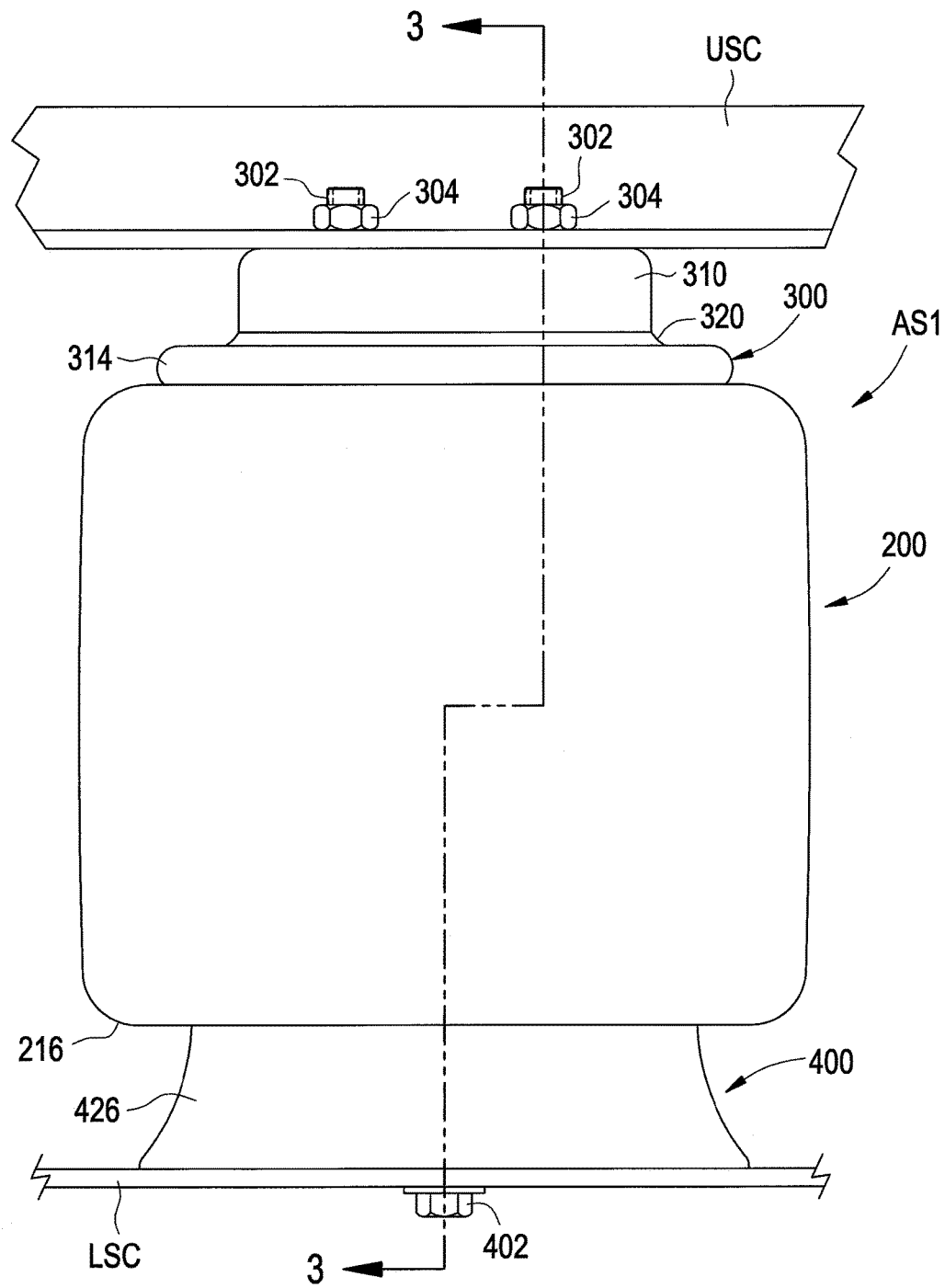
FIG. 2 is a side view of one example of a gas spring and gas damper assembly in accordance with the subject matter of the present disclosure.
Figure 3:
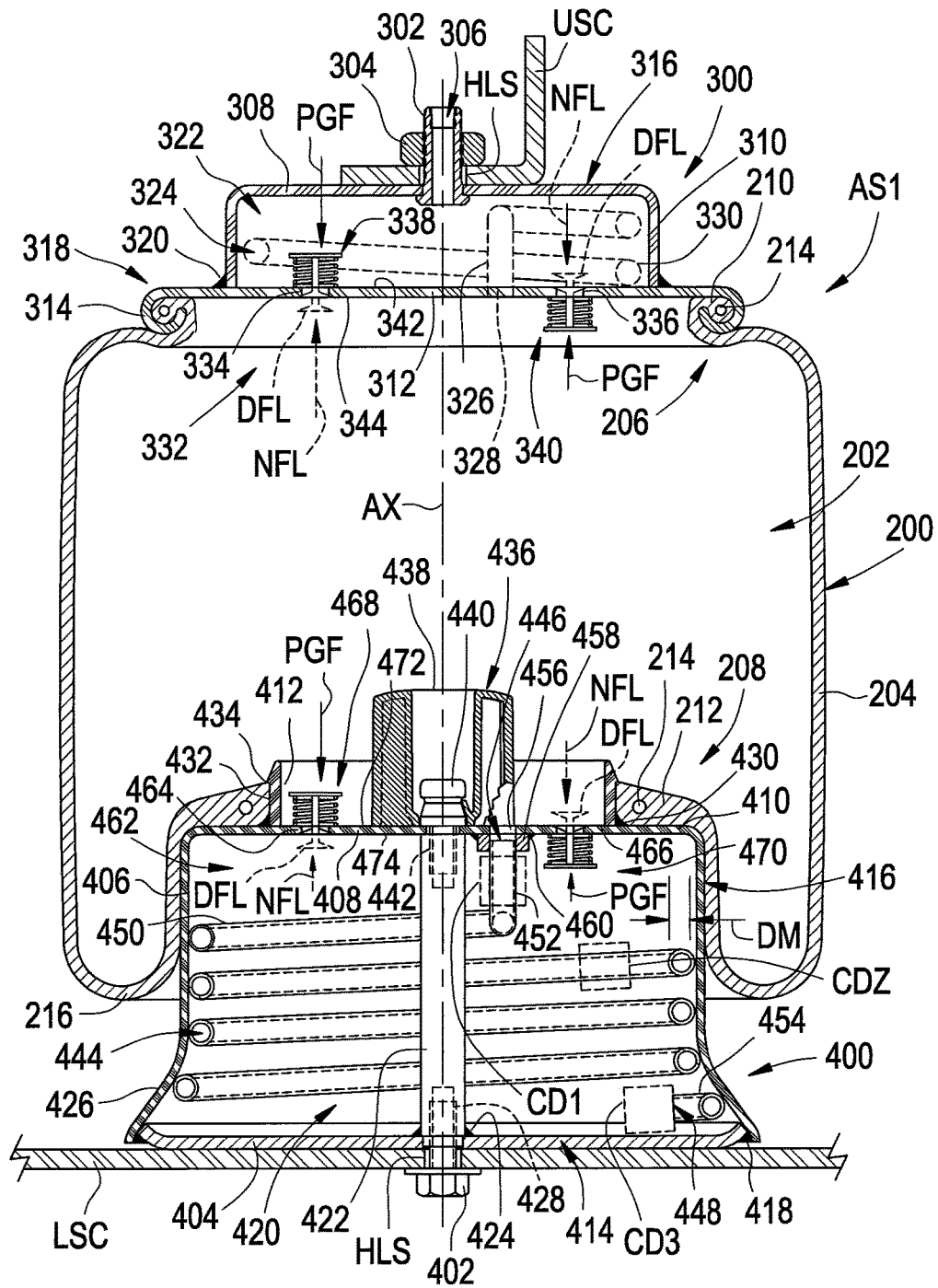
FIG. 3 is a cross-sectional side view of the gas spring and gas damper assembly in FIG. 2 taken from along line 3-3 therein.

One example of a gas spring and gas damper assembly AS1 in accordance with the subject matter of the present disclosure, such as may be suitable for use as gas spring and gas damper assemblies 102, for example, is shown in FIGS. 2 and 3. Gas spring and gas damper assembly AS1 is shown as having a longitudinally-extending axis AX (FIG. 3) and can include a flexible spring member 200 that can extend peripherally around axis AX. Assembly AS1 can also include any combination of one or more end members, such as one or more of an end member 300 and/or an end member 400. Flexible spring member 200 can be secured between the one or more end members in a substantially fluid-tight manner such that a spring chamber 202 (FIG. 3) is at least partially defined therebetween.

Gas spring and gas damper assembly AS1 can be disposed between associated sprung and unsprung masses of an associated vehicle in any suitable manner. For example, one end member can be operatively connected to the associated sprung mass with the other end member disposed toward and operatively connected to the associated unsprung mass.

Figure 13:
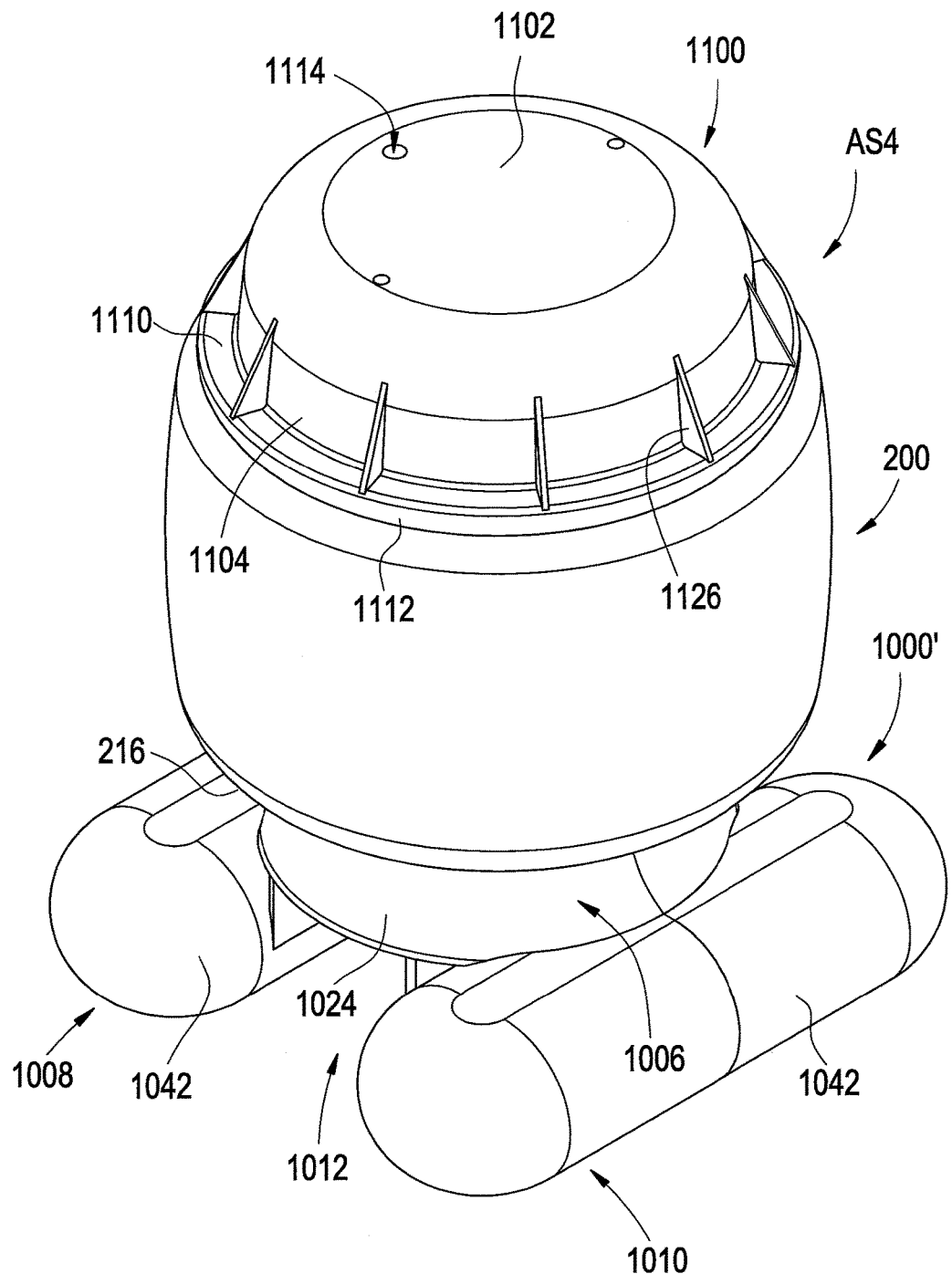
FIG. 13 is a top perspective view of an alternate construction of the gas spring and gas damper assembly in FIGS. 10-12.

As shown in FIGS. 2 and 3, for example, end member 300 can be secured on or along a first or upper structural component USC, such as associated vehicle body BDY in FIG. 1, for example, and can be secured thereon in any suitable manner. For example, one or more securement devices, such as mounting studs 302, for example, can be included along end member 300. In some cases, the one or more securement devices (e.g., mounting studs 302) can project outwardly from end member 300 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 304 or other securement devices, for example. As an alternative to one or more of mounting studs 302, one or more threaded passages (e.g., blind passages and/or through passages) could be used in conjunction with a corresponding number of one or more threaded fasteners, such as are illustrated in FIG. 13, for example.

Additionally, one or more fluid communication ports, such as transfer passages 306, for example, can, optionally, be provided to permit fluid communication with spring chamber 202, such as may be used for transferring pressurized gas into and/or out of the spring chamber, for example. In the exemplary embodiment shown, transfer passages 306 extend through at least one of mounting studs 302 and are in fluid communication with spring chamber 202. It will be appreciated, however, that any other suitable fluid communication arrangement could alternately be used.

End member assembly 400 can be secured on or along a second or lower structural component LSC, such as an axle AXL in FIG. 1, for example, in any suitable manner. As one example, lower structural component LSC could include one or more mounting holes HLS extending therethrough. In such case, a threaded fastener 402 could extend through one of mounting holes HLS and threadably engage end member 400 or another component of the assembly to secure the end member on or along the lower structural component.

Flexible spring member 200 can be of any suitable size, shape, construction and/or configuration. As one example, flexible spring member 200 can include a flexible wall 204 that is at least partially formed from one or more layers or plies of elastomeric material (e.g., natural rubber, synthetic rubber and/or thermoplastic elastomer) and can optionally include one or more plies or layers of filament reinforcing material (not shown). Flexible wall 204 is shown extending in a longitudinal direction between opposing ends 206 and 208. In some cases, flexible spring member 200 can, optionally, include a mounting bead disposed along either one or both of ends 206 and 208 of the flexible wall. In the arrangement shown in FIGS. 2 and 3, for example, mounting beads 210 and 212 are shown as being respectively disposed along ends 206 and 208. In some cases, the mounting beads can, optionally, include a reinforcing element, such as an endless, annular bead wire 214, for example.

As indicated above, a gas spring and gas damper assembly in accordance with the subject matter of the present disclosure can include or be otherwise associated with at least one additional volume, reservoir and/or other chamber that is dissociated or otherwise fluidically distinguishable from the spring chamber. It will be appreciated that any combination of one or more volumes, reservoirs and/or other chambers that are internal and/or external to the gas spring and gas damper assembly can be used. For example, in some cases, one or more end members of the gas spring and gas damper assembly can at least partially define the spring chamber and can also at least partially define an additional volume, reservoir or chamber that is internal to the gas spring and gas damper assembly. It will be appreciated, however, that such one or more end members can be of any suitable type, kind, configuration and/or construction.

As one example, end member 300 is shown as being of a type that may, in some cases, be referred to as a reservoir bead plate and includes a mounting wall portion 308, at least one side wall portion 310, a partition wall portion 312 and an outer peripheral wall portion 314. As indicated above, the walls or wall portions of end member 300 can be formed, assembled and/or otherwise constructed in any suitable manner, and can include one or more walls and/or wall portions connected in any suitable manner and that include any combination of one or more of the foregoing and/or other walls or wall portions.

For example, end member 300 can be assembled from a wall section 316 that includes mounting wall portion 308 and at least one side wall portion 310. In the arrangement shown in FIGS. 2 and 3, side wall portion 310 can extend axially from along mounting wall portion 308 and peripherally about axis AX. End member 300 can also include a wall section 318 that includes partition wall portion 312 and outer peripheral wall portion 314, which extends axially from along the partition wall portion and extends peripherally about axis AX. Wall sections 316 and 318 can be secured to one another in any manner suitable for forming a substantially fluid tight connection between two or more of the wall portions thereof, such as by way of a flowed-material joint 320, for example. It will be appreciated, however, that other configurations and/or constructions could alternately be used.

End member 300 can be secured on or along an associated structural component (e.g., upper structural component USC) in any suitable manner. For example, mounting studs 302 can extend through and be secured along mounting wall portion 308 and can project axially-outwardly from the mounting wall portion in a direction away from end member 400. The mounting wall portion can be disposed in abutting engagement with the associate structural component (e.g., upper structural component USC) and can be secured thereto using mounting studs 302, such as has been described above.

As described above, one or more of the end members of a gas spring and gas damper assembly in accordance with the subject matter of the present disclosure can include a damper volume, damper reservoir and/or other damping chamber that is separate from the spring chamber (e.g., spring chamber 202) but that is capable of being placed in fluid communication with the spring chamber such that pressurized gas damping can be generated as a result of pressurized gas flow between the spring chamber and the volume, reservoir or other chamber of the one or more end members. In the arrangement shown in FIGS. 2 and 3, for example, end member 300 includes a damper reservoir 322 that is at least partially formed by one or more wall portions of the end member, such as one or more of mounting wall portion 308, side wall portion 310 and/or partition wall portion 312, for example.

It will be appreciated that the damper volume, damper reservoir or other damping chamber of an end member can, in some cases, be in fluid communication with one or more pressurized gas sources, pressurized gas transfer lines and/or other pressurized gas volumes, reservoirs and/or chambers in any suitable manner. For example, reservoir 322 is shown as being in fluid communication with transfer passage 306, which can permit fluid communication with one or more other gas spring and gas damper assemblies (e.g., one or more of assemblies 102) and/or one or more components of a pressurized gas system, such as has been described above in connection with suspension system 100 and pressurized gas system 104, for example.

Furthermore, it will be appreciated that the one or more end members of the gas spring and gas damper assembly can be operatively connected or otherwise secured to the flexible spring member in any suitable manner. For example, end member 300 is shown as being secured to end 206 of flexible wall 204 using a crimped-edge connection (not numbered) in which outer peripheral wall portion 314 of end member 300 is crimped or otherwise deformed around mounting bead 210 such that a substantially fluid-tight seal is formed therebetween.

As another example, end member 400 is shown as being of a type commonly referred to as a piston (or a roll-off piston), and can include a mounting wall portion 404, a side wall portion 406 and a partition wall portion 408. In some cases, end member 400 can also include an end wall portion 410 and a side wall portion 412. In the arrangement shown in FIGS. 2 and 3, for example, mounting wall portion 404 at least partially defines a wall section 414, and at least side wall portion 406 and partition wall portion 408 define a wall section 416 of end member 400. In some cases, wall section 414 can at least partially form a component that may be referred to as a piston base, and wall section 416 can at least partially form a component may be referred to as a piston shell. Additionally, it will be appreciated that wall sections 414 and 416 can be secured to one another in any manner suitable for forming a substantially fluid tight connection between two or more of the wall portions thereof, such as by way of a flowed-material joint 418, for example. It will be appreciated, however, that other configurations and/or constructions could alternately be used.

As described above, one or more of the end members of a gas spring and gas damper assembly in accordance with the subject matter of the present disclosure can include a damper volume, damper reservoir and/or other damping chamber that is separate from the spring chamber (e.g., spring chamber 202) but that is capable of being placed in fluid communication with the spring chamber such that pressurized gas damping can be generated as a result of pressurized gas flow between the spring chamber and the volume, reservoir or other chamber of the one or more end members. In the arrangement shown in FIGS. 2 and 3, for example, end member 400 includes a damper reservoir 420 that is at least partially formed by one or more wall portions of the end member, such as one or more of mounting wall portion 404, side wall portion 406 and/or partition wall portion 408, for example.

In some cases, either or both of the end members can include one or more additional features, elements and/or components, such as within the damper reservoir thereof, for example. As one non-limiting example, end member 400 shown in FIG. 3 as including a post or column 422 that extends between an end (not numbered) operatively connected to mounting wall portion 404 and an end (not numbered) operatively connected to partition wall portion 408. It will be appreciated that such a post, which is optional, can be secured on or along mounting wall portion 404 and/or partition wall portion 408 in any suitable manner. For example, one end of post 422 can be secured to mounting wall portion 404 in a manner suitable for forming a substantially fluid-tight connection with the mounting wall portion, such as by way of a flowed-material joint 424, for example.

It will be recognized that a wide variety of sizes, shapes, profiles and/or configurations can and have been used in forming end members of the type and kind referred to as pistons or roll-off pistons, such as end member 400, for example. As such, it will be appreciated that the wall portions of the end member (e.g., side wall portion 404) can be of any suitable shape, profile and/or configuration, such as may be useful to provide one or more desired performance characteristics, for example, and that the profile shown in FIGS. 2 and 3 is merely exemplary.

Side wall portion 406 of end member 400 has an outer surface 426 that abuttingly engages flexible spring member 200 such that a rolling lobe 216 is formed along flexible wall 204. As gas spring and gas damper assembly AS1 is displaced between compressed and extended conditions, rolling lobe 216 can be displaced along outer surface 426 in a generally conventional manner.

End member 400 can be secured on or along an associated structural component (e.g., lower structural component LSC) in any suitable manner. For example, mounting wall portion 404 can be disposed in abutting engagement with the associated structural component (e.g., lower structural component LSC) and can be secured thereto using threaded fastener 402, such as has been described above. In such cases, one or more threaded connections can be provided on or along end member 400 in any suitable manner. As one example, post 422 can include a threaded passage 428 that is accessible from along the exterior of the end member. Threaded fastener 402 can extend through one of mounting holes HLS in lower structural component LSC and threadably engage mounting wall portion 404 or another feature or component of end member 400, such as threaded passage 428 of post 422, for example, to secure the end member on or along the lower structural component. It will be appreciated, however, that other configurations and/or constructions could alternately be used.

As indicated above, it will be appreciated that the one or more end members of the gas spring and gas damper assembly can be operatively connected or otherwise secured to the flexible spring member in any suitable manner. For example, wall section 416 of end member 400 can include side wall portion 412 that extends longitudinally-outwardly beyond partition wall portion 408 and/or end wall portion 410, and extends peripherally about axis AX. It will be appreciated that side wall portion 412 can be secured to one or more other wall portions of wall section 416 in any suitable manner. As one example, side wall portion 412 can be secured on or along partition wall portion 408 and/or end wall portion 410 such that a substantially fluid-tight seal is formed therebetween, such as by way of a flowed-material joint 430, for example. In some cases, side wall portion 412 can be positioned such that end wall portion 410 extends radially outward from along side wall portion 412 toward side wall portion 406 and partition wall portion 408 extends radially inward from along side wall portion 412.

Side wall portion 412 has an outer surface 432 that is dimensioned to receive mounting bead 212 of end 208 of flexible wall 204 such that a substantially fluid-tight seal can be formed therebetween. In some cases, a retaining ridge 434 can project radially outward from along the side wall portion 412 and can extend peripherally along at least a portion thereof, such as may assist in retaining end 208 of flexible wall 204 in abutting engagement on or along the side wall portion.

It will be appreciated that a gas spring and gas damper assembly in accordance with the subject matter of the present disclosure (e.g., assemblies 102 and/or AS1) can include any number of one or more additional features, components and/or devices. For example, gas spring and gas damper assembly AS1 can, optionally, include a jounce bumper supported on one of the end members and suitable for inhibiting direct contact between the end members and/or transferring axially-applied loads or forces between the end members. It will be appreciated that the jounce bumper, if included, can be of any suitable size, shape and/or construction, and can be secured on or along the associated end member in any suitable manner. In the arrangement shown in FIG. 3, for example, gas spring and gas damper assembly AS1 includes a jounce bumper 436 that is supported along end member 400 and includes a distal end wall 438 dimensioned to abuttingly engage end member 300 or another component, such as may occur during a jounce or collapsed condition of the gas spring and gas damper assembly.

In some cases, a bumper mount 440 can be disposed on or along end member 400 and can be dimensioned to receive and retain jounce bumper 436. It will be appreciated that bumper mount 440 can be secured to the end member in any suitable manner. As one example, partition wall portion 408 can include a hole or opening (not numbered) extending therethrough and post 422 can include a threaded passage 442 that is accessible through the opening in partition wall portion 408. Bumper mount 440 can include a threaded stud (not numbered) that can operatively engage threaded passage 442 of post 422 to thereby secure the bumper mount on or along end member 400. Additionally, in this manner, axially applied loads or forces can be transmitted from jounce bumper 436, through post 422 to mounting wall portion 404, such as from impacts imparted on the jounce bumper, for example. It will be appreciated, however, that other configurations and/or arrangements could alternately be used.

As indicated above, a gas spring and gas damper assembly in accordance with the subject matter of the present disclosure can include one or more elongated gas damping passages fluidically connected between the spring chamber and one or more gas damper reservoirs. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

As discussed above, a gas spring and gas damper assembly in accordance with the subject matter of the present disclosure can include an elongated gas damping passage in fluid communication between the spring chamber and an associated gas damper reservoir (e.g., one of gas damper reservoirs 322 and 420). Differential pressure between the associated chambers (e.g., spring chamber 202 and one of gas damper reservoirs 322 and 420) can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-4 Hz, vibrations from 8-12 Hz and vibrations from 15-25 Hz.

Figure 15:
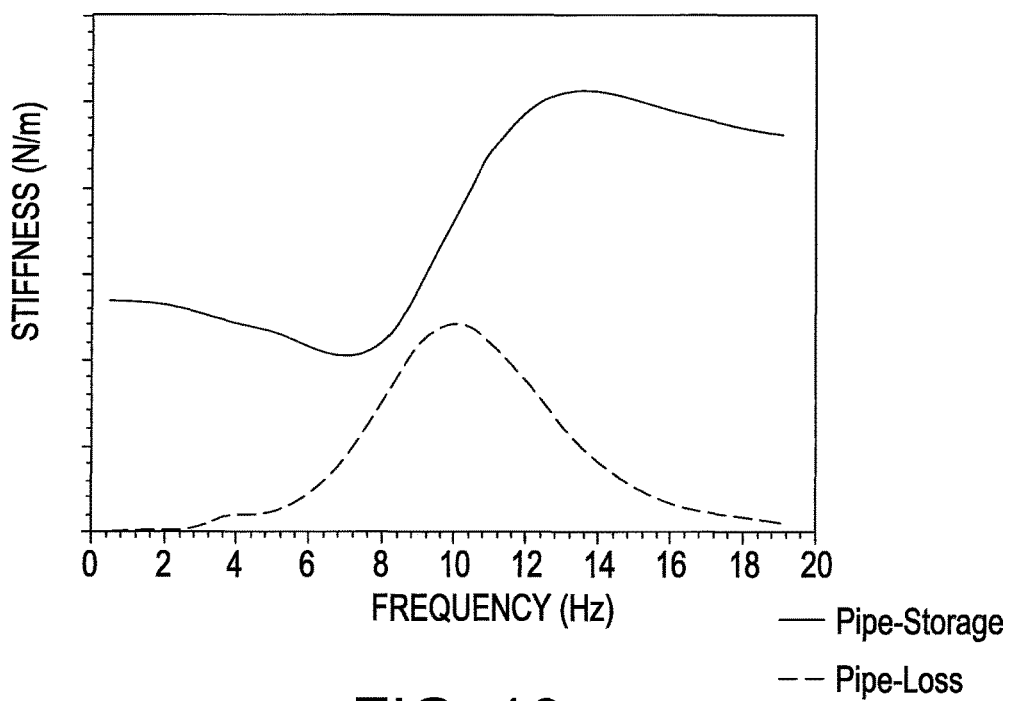
FIG. 15 is a graphical representation of one example of stiffness versus frequency illustrating behavior of a gas spring and gas damper assembly that includes an elongated gas damping passage in accordance with the subject matter of the present disclosure.

FIG. 15 a graphical representation of one example of performance characteristics of a gas spring and damper assembly that includes an elongated gas damping passage in accordance with the subject matter of the present disclosure. More specifically, FIG. 15 is a graphical representation of stiffness versus frequency and includes a plot line representing pipe storage and a plot line representing pipe loss. It will be recognized from FIG. 15 that peak loss stiffness of the pipe loss plot line occurs at approximately 10 Hz or within a range of from approximately 8-12 Hz, which can respectively correspond to or otherwise represent a targeted frequency or targeted range of frequencies for vibration damping.

Figure 16:
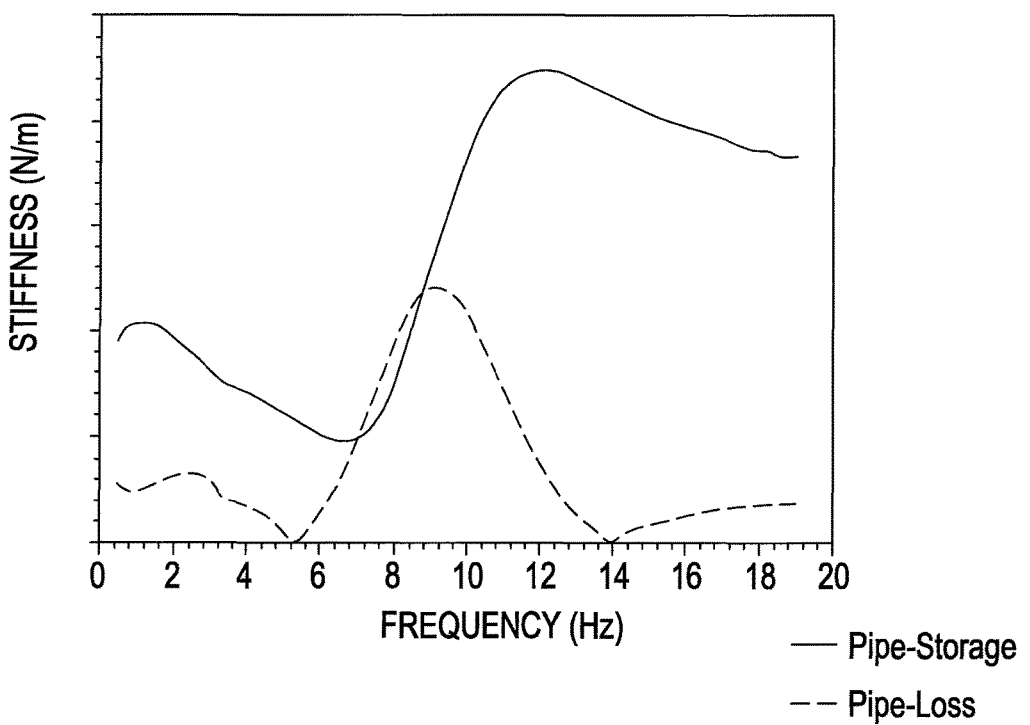
FIG. 16 is a graphical representation of another example of stiffness versus frequency illustrating behavior of a gas spring and gas damper assembly that includes two elongated gas damping passages in accordance with the subject matter of the present disclosure tuned to provide pressurized gas damping at two different target frequencies.

As discussed above, a gas spring and gas damper assembly in accordance with the subject matter of the present disclosure can include a combination of features and/or components suitable for generating pressurized gas damping at two or more predetermined or targeted frequencies or otherwise within two or more predetermined or otherwise targeted ranges of frequencies. FIG. 16 a graphical representation of another example of performance characteristics of a gas spring and damper assembly that includes a combination of a first elongated gas damping passage as well as a second elongated damping passage and/or one or more other control devices in accordance with the subject matter of the present disclosure. More specifically, FIG. 16 is a graphical representation of stiffness versus frequency and includes a plot line representing pipe storage and a plot line representing pipe loss. It will be recognized from FIG. 16 that two occurrences of peak loss stiffness of the pipe loss plot line are represented. It will be appreciated that the combination of spring chamber, gas damping reservoir or reservoirs, elongated gas damping passage or passages and/or any additional control devices can generate pressurized gas damping having a peak loss stiffness at approximately 2.5 Hz or within a range of from approximately 1-4 Hz and a peak loss stiffness at approximately 9 Hz or within a range of from approximately 7-11 Hz, which can respectively correspond to or otherwise represent targeted frequencies or targeted ranges of frequencies for vibration damping.

As discussed above, the combination of cross-sectional area and overall length of the elongated gas damping passage can be dimensioned, sized and/or otherwise configured to generate gas flow having sufficient mass and sufficient velocity to achieve the desired level of pressurized gas damping. Generally, a gas spring and gas damper assembly in accordance with the subject matter of the present disclosure can include an elongated gas damping passage that has an overall length that is at least (10) times the maximum dimension (either actual or as a diametric equivalent) of the cross-sectional shape (e.g., the diameter of a circular passage) of the elongated gas damping passage. In a preferred arrangement, the overall length of the elongated gas damping passage will be at least twenty (20) times the maximum dimension of the cross-sectional shape. In some cases, the overall length of the elongated gas damping passage can be at least fifty (50) times the maximum dimension of the cross-sectional shape of the elongated gas damping passage. In other cases, the overall length of the elongated gas damping passage can be at least one hundred (100) times the maximum dimension of the cross-sectional shape of the elongated gas damping passage. Non-limiting examples of suitable ranges for dimensions of an elongated gas damping passage in accordance with the subject matter of the present disclosure can include an inside cross-sectional dimension (e.g., inside diameter) within a range of from approximately five (5) millimeters to approximately fifty (50) millimeters and an overall length of from approximately one-half (0.5) meter to approximately five (5) meters.

It will be appreciated that the aforementioned maximum dimension of the cross-sectional shape of the elongated gas damping passage can be either actual or a theoretical equivalent dimension. For example, an actual diameter of a circular passage, a major diameter of an elliptical passage or a height or width of a rectangular passage could be used. For non-circular and/or irregularly-shaped passages, a theoretical equivalent maximum dimension could be used. As one example, the actual cross-sectional area of the passage could be determined as area $A_{ACT}$. A theoretical equivalent maximum cross-sectional dimension $D_{EQV}$ of a theoretical circular passage having the same cross-sectional area as that of the non-circular and/or irregularly-shaped passage could be determined. As one example, the theoretical equivalent maximum cross-sectional dimension could be calculated by using the equation:

$$D_{EQV} = \sqrt{\left(\frac{4A_{ACT}}{\pi}\right)}$$

It will be appreciated, however, that other determinations of a theoretical maximum cross-sectional dimension could alternately be used.

As shown herein, the one or more elongated gas damping passages are typically disposed within the associated gas spring and gas damper assembly. In some cases, substantially all of the elongated gas damping passages can be provided outside of the spring chamber (e.g., spring chamber 202), such as by extending within or through one of the end members (e.g., end members 300 and/or 400). It will be appreciated, however, that the one or more elongated gas damping passages can be configured or otherwise arranged within the gas spring and gas damper assembly in any suitable manner, such as by having one or more portions or sections that are linear, coiled, curved, serpentine or any combination of these and/or other configurations and/or arrangements. In some cases, performance benefits may be achieved in comparison with other configurations by using a coiled or helical arrangement in which the elongated gas damping passage extends about an axis through at least a portion of at least one turn of a helix such that first and second portions and/or ends of the elongated gas damping passage can be disposed in axially-spaced relation to one another. In such cases, it will be appreciated that any suitable coil dimension can be used, such as an outside diameter within a range of from approximately twenty (20) millimeters to approximately five hundred (500) millimeters, for example.

It will be appreciated that the one or more elongated gas damping passages can provided in any suitable manner and through the use of any suitable combination of one or more features, elements and/or components. For example, one or more elongated gas damping passages can be at least partially formed by one or more components that are provided separately from the one or more walls and/or wall portions of the end members. As another example, one or more elongated gas damping passages can be at least partially formed by one or more walls and/or wall portions of one or more of the end members.

As one non-limiting example, gas spring and gas damper assembly AS1 is shown in FIGS. 2 and 3 as including an elongated gas damping passage 444 that is at least substantially-entirely disposed within gas damper reservoir 420, and extends between a passage end 446 disposed in fluid communication with spring chamber 202 and a passage end 448 disposed in fluid communication with gas damper reservoir 420. The elongated gas damping passage will have an overall length (not represented) and a cross-sectional shape with a maximum cross-sectional dimension, such as is represented by reference dimension DM (FIG. 3), for example. Non-limiting examples of suitable cross-sectional shapes for the elongated gas damping passage (e.g., passage 444) can include approximately circular, ovoid, elliptical, rectangular, square and/or other curved or polygonal shapes. In some cases, the cross-sectional shape may be substantially uniform along the length of the passage. In other cases, different sections or portions of the elongated gas damping passage can have different cross-sectional shapes.

As indicated above, elongated gas damping passage 444 can be formed in any suitable manner and from any suitable combination of features, elements and/or components. In the arrangement shown in FIG. 3, elongated gas damping passage 444 is shown as being at least partially formed by an elongated length of tubular material (not numbered) that is arranged in or otherwise extends through a plurality of helical coils or loops. As discussed above, however, it will be appreciated that any other configuration and/or arrangement could alternately be used. Additionally, the elongated length of tubular material can be formed from any suitable material or combination of materials, such as metal (e.g., aluminum, brass, copper, steel) and/or polymeric materials (e.g., rigid or flexible thermoplastic material). Furthermore, the elongated length of tubular material can be formed into or otherwise include a tube wall 450 that at least partially defines elongated gas damping passage 444. Tube wall 450 can include a tube end 452 through which passage end 446 extends and a tube end 454 through which passage end 448 extends.

It will be appreciated that tube wall 450 can be secured to or otherwise operatively connected with one or more walls and/or wall portions of end member 400 in any suitable manner. For example, end member 400 can include a port or opening 456 extending through partition wall portion 408, and tube end 452 can be secured on or along partition wall portion 408 in any manner suitable for passage end 446 to be disposed in fluid communication with port 456. As one example, a connector fitting 458 can be secured on or along partition wall portion 408, such as by way of a flowed-material joint 460, for example. The connector fitting can be dimensioned to receive and retain the tube end. It will be appreciated, however, that other configurations and/or arrangements could alternately be used.

As another non-limiting example, gas spring and gas damper assembly AS1 can, additionally or in the alternative, include an elongated gas damping passage 324 that is at least substantially-entirely disposed within gas damper reservoir 322. Elongated gas damping passage 324 can extend between a passage end 326 disposed in fluid communication with spring chamber 202, such as by way of an opening or port 328 extending through partition wall portion 312, for example. Additionally, elongated gas damping passage 324 can include a passage end 330 disposed in fluid communication with gas damper reservoir 322. The elongated gas damping passage will have an overall length (not represented) and a cross-sectional shape with a maximum cross-sectional dimension (not identified), such as an approximately circular, ovoid, elliptical, rectangular, square or other curved or polygonal shape, for example. As indicated above, the cross-sectional shape can, in some cases, be substantially uniform along the length of the passage. In other cases, different sections or portions of the elongated gas damping passage could have different cross-sectional shapes.

As indicated above with respect to elongated gas damping passage 444, passage 324 can be formed in any suitable manner and from any suitable combination of features, elements and/or components, such as an elongated length of tubular material (not numbered) that is arranged in or otherwise extends through a plurality of helical coils or loops. As discussed above, however, it will be appreciated that any other configuration and/or arrangement could alternately be used, such as annular and/or serpentine, for example. Additionally, the elongated length of tubular material can be formed from any suitable material or combination of materials, such as metal (e.g., aluminum, brass, copper, steel) and/or polymeric materials (e.g., rigid or flexible thermoplastic material). Furthermore, the elongated length of tubular material can be formed into or otherwise include a tube wall (not shown) that at least partially defines elongated gas damping passage 324. As discussed above in connection with tube wall 450, the tube wall of passage 324 can include a tube end (not shown) through which passage end 326 extends and a tube end (not shown) through which passage end 330 extends, and can, as one example, be secured on or along the end member in a similar manner to that discussed above in connection with connector fitting 458. It will be appreciated, however, that any other suitable configuration and/or arrangement could alternately be used.

Additionally, or as an alternative to one of elongated gas damping passage 324 and/or 444, a gas spring and gas damper assembly according to the subject matter of the present disclosure can, optionally, include one or more flow control systems that are operatively connected between the spring chamber and one of the one or more pressurized gas volumes, pressurized gas reservoirs and/or other pressurized gas chambers. In some cases, a plurality of flow control systems can be included with the flow control systems disposed in fluid communication in any combination and/or arrangement between the spring chamber and the one or more pressurized gas damping reservoirs.

In a preferred arrangement, the one or more flow control systems can be adapted to selectively permit and/or inhibit pressurized gas flow between the spring chamber and the corresponding pressurized gas volume in one or more directions of flow under pre-determined differential pressure conditions. It will be appreciated that the flow control systems can be of any suitable size, shape, configuration and/or construction, and can include any combination of features and components suitable for generating pressurized gas damping of vibrations acting on the gas spring and gas damper assembly. In some cases, a flow control system can include one or more gas flow passages and one or more control devices operatively associated with the gas flow passages. In some cases, two or more control devices can be included with each control device operatively associated with a different gas flow passage. Additionally, in some cases, the one or more control devices can be differential pressure-actuated control devices that open and close in response to pre-determined differential pressure conditions between the spring chamber and the corresponding pressurized gas damping reservoir or other volume.

In a preferred arrangement, a combination of the performance characteristics of a flow control system and the performance characteristics of the pressurized gas damping reservoir or other volume can be tuned or otherwise selected or configured to generate damping of vibrations at a predetermined or target frequency or within or otherwise across a predetermined and/or targeted frequency range. In some cases, the gas spring and gas damper assembly can include two or more different flow control systems fluidically associated with a different pressurized gas damping reservoirs. In such cases, pressurized gas damping of vibrations can be achieved that is tuned to two or more different targeted or otherwise predetermined frequency ranges, such as has been discussed above, for example.

Examples of suitable constructions of flow control systems of a gas spring and gas damper assembly in accordance with the subject matter of the present disclosure are identified in FIG. 3 as flow control systems 332 and 462. Flow control system 332 is shown as being disposed on or along partition wall portion 312 of end member 300. As such, flow control assembly 332 is operatively associated with corresponding damper reservoir 322 such that pressurized gas damping can be generated as a result of pressurized gas transfer into, out of and/or between spring chamber 202 and damper reservoir 322. Additionally, flow control system 462 is shown as being disposed on or along partition wall portion 408 of end member 400. As such, flow control assembly 462 is operatively associated with corresponding damper reservoir 420 such that pressurized gas damping can be generated as a result of pressurized gas transfer into, out of and/or between spring chamber 202 and damper reservoir 420.

In the arrangement shown in FIG. 3, flow control assembly 332 is shown as including gas flow ports or passages 334 and 336 that extend through partition wall portion 312. As such, flow control assembly 332 can be operative to permit, inhibit and/or otherwise at least partially control pressurized gas flow between spring chamber 202 and damper reservoir 322 through ports 334 and 336. Flow control assembly 332 can also include at least one control device (e.g., a valve) that is fluidically associated with a corresponding one of the gas flow ports. In the arrangement shown in FIG. 3, two control devices are included with a control device 338 operatively associated with port 334 and a control device 340 operatively associated with port 336.

Additionally, flow control assembly 462 is shown as including gas flow ports or passages 464 and 466 that extend through partition wall portion 408. As such, flow control assembly 462 can be operative to permit, inhibit and/or otherwise at least partially control pressurized gas flow between spring chamber 202 and damper reservoir 420 through ports 464 and 466. Flow control assembly 462 can also include at least one control device (e.g., a valve) that is fluidically associated with a corresponding one of the gas flow ports. In the arrangement shown in FIG. 3, two control devices are included with a control device 468 operatively associated with port 464 and a control device 470 operatively associated with port 466.

In some cases, one or more of the control devices (e.g., one or more of control devices 338, 340, 468 and/or 470) can take the form of one-way valves that substantially inhibit pressurized gas flow through a corresponding port in one direction, as is represented in FIG. 3 by dashed arrows NFL, while permitting pressurized gas flow through the corresponding port in the opposing direction, as is represented in FIG. 3 by arrows PGF. For example, control devices 338, 340, 468 and 470 are shown as taking the form of normally-closed valves that are naturally biased toward a closed condition and that are actuated or otherwise opened as a result of a gas pressure differential acting on the control devices. As such, control devices 338 and 340 are shown as being disposed along opposing surfaces 342 and 344 of partition wall portion 312, and control devices 468 and 470 are shown as being disposed along opposing surfaces 472 and 474 of partition wall portion 408. It will be appreciated, however, that other configurations and/or arrangements could alternately be used.

Additionally, it will be appreciated that any combination of one or more types, kinds and/or constructions of control devices can be used. In the arrangement shown in FIG. 3, for example, control devices 338, 340, 468 and 470 are shown as taking the form of spring-biased piston valves that are substantially similar to one another. The control valves can include a valve body (not numbered) that is received within one of the ports. As one example, the valve body can includes a head (not numbered) that abuttingly engages the partition wall portions, a connecting rod (not numbered) that extends axially from the head and a flange (not numbered) that is secured along the connecting rod opposite the head. Additionally, the control devices can include a biasing element (not numbered), such as a compression spring, for example, that is operatively disposed between the flange and a surface of the partition wall portion.

The valve body of one or more of the control devices (e.g., one or more of control devices 338, 340, 468 and/or 470) can be maintained in a normally-closed condition in any suitable manner that is capable of being selectively displaced into an open condition under the influence of a predetermined (or greater) gas pressure differential, as discussed above. In some cases, the valve body can be urged or otherwise biased into a closed condition by the biasing element. In such cases, the biasing element can have intrinsic mechanical and/or material properties (e.g., spring rate and/or flexural stiffness) that maintain the associated control device in a closed condition until a predetermined differential gas pressure is reached or exceeded. Upon experiencing differential pressure conditions of at least approximately the predetermined magnitude, the biasing element can be compressed and the valve body can be displaced into an open condition, such as is illustrated by dashed lines DFL in FIG. 3, for example.

Additionally, or as a further alternative to one of elongated gas damping passage 324 and/or 444 and/or as a further alternative to either or both of control devices 332 and/or 462 (or a portion thereof), a gas spring and gas damper assembly in accordance with the subject matter of the present disclosure can, optionally, include any combination of additional control devices, such as are schematically represented in FIG. 3 by boxes CD1, CD2 and CD3. It will be appreciated that control device CD1 is shown as being disposed in fluid communication with elongated gas damping passage 444 adjacent passage end 446 and that control device CD3 is shown as being disposed in fluid communication with elongated gas damping passage 444 adjacent passage end 448 with control device CD2 disposed in fluid communication with the elongated damping passage in an intermediate position between passage ends 446 and 448. It will be appreciated, however, that other configurations and/or arrangements could alternately be used. Importantly, though not shown in FIG. 3 as being used in connection with elongated gas damping passage 324, it is to be recognized and appreciated that any one or more of control devices CD1, CD2 and/or CD3 can be used in operative association with elongated gas damping passage 324, such as in the manner described above in connection with elongated gas damping passage 444, for example, and that the foregoing description of such application and use is equally applicable to elongated gas damping passage 324 without limitation.

Figure 4:
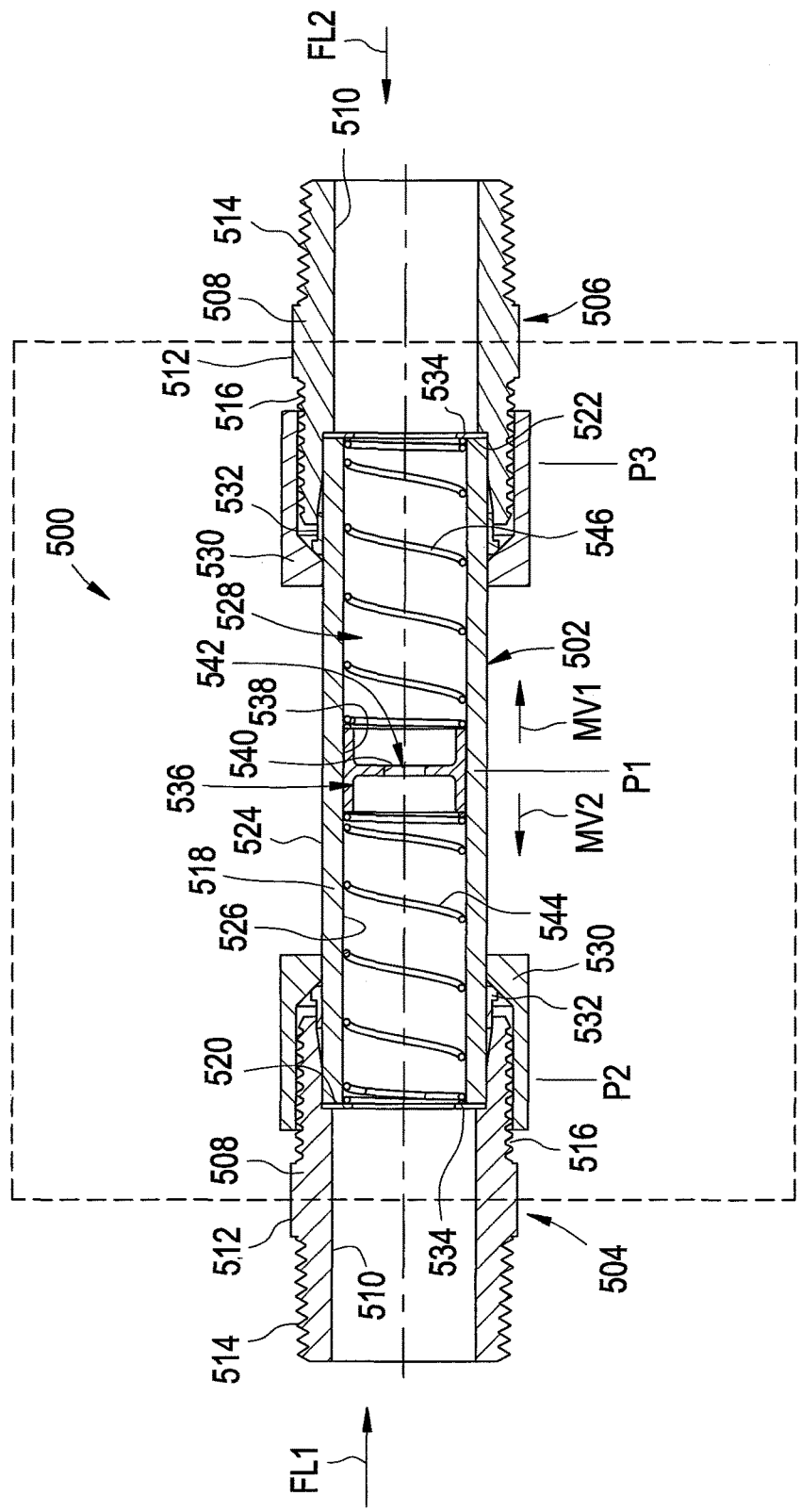
FIG. 4 is a cross-sectional side view of one example of a control device suitable for use in fluid communication along an elongated gas damping passage in accordance with the subject matter of the present disclosure.

One example of a control device 500 that is suitable for use as one or more of control devices CD1, CD2 and/or CD3 is shown in FIG. 4 as including a housing 502 that is operatively secured to connector fittings 504 and 506 in a manner suitable for forming a substantially fluid-tight connection between housing 502 and the connector fittings. In the arrangement shown in FIG. 4, connector fittings 504 and 506 are disposed along opposing ends of the control device. It will be appreciated that connector fittings 504 and 506 can be dimensioned and configured for securement in fluid communication on or along one of the elongated gas damping passages, such as one or more of passages 324 and/or 444, for example, in any suitable manner. For example, connector fittings 504 and 506 can include a fitting wall 508 that includes an inner surface 510 and an outer surface 512. The connector fittings can include at least one helical thread formed along at least one of the opposing ends of the fitting wall. In the arrangement shown, connector fittings 504 and 506 include helical threads 514 and 516 formed along outer surface 512 of the fitting wall.

Housing 502 includes a housing wall 518 that extends lengthwise between opposing end edges 520 and 522. Housing wall 518 includes an outer surface 524 and an inner surface 526 that at least partially defines a passage 528 extending lengthwise through housing 502. In a preferred arrangement, inner surfaces 510 of connector fittings 504 and 506 are dimensioned to cooperate with inner surface 526 such that passage 528 can extend through control device 500. Connector fittings 504 and 506 can be secured on or along housing 502 in any suitable manner, such as by way of a threaded nut 530 and compression element 532, for example, that can cooperatively engage housing 502 and one of the connector fittings in a conventional manner. In some cases, a washer or other element 534 can be captured between one of end edges 520 and 522 and a corresponding one of connector fittings 504 and 506, such as may be useful for providing a shoulder surface for engaging another component and/or to further act as a sealing element between the housing and a corresponding one of the connector fittings, for example.

Control device 500 can also include a displaceable element 536 that is disposed within passage 528. Element 536 can include an outer surface 538 disposed adjacent inner surface 526 of housing wall 518. The displaceable element can also include an inner surface 540 that at least partially defines an orifice 542 extending through element 536. Control device 500 further includes biasing elements 544 and 546 that are disposed along opposing sides of displaceable element 536 and engage a shoulder surface (not numbered), such as can be formed by washer elements 534, for example. Biasing elements 544 and 546 can permit displaceable element 536 to move within passage 528 under the influence of pressurized gas flow into, out of or otherwise within control device 500, such as in the manner described hereinafter, for example.

In some cases, biasing elements 544 and 546 can maintain displaceable element 536 in a central position within passage 528, which is represented in FIG. 4 by reference number P1. Depending upon various features and/or characteristics of the control device, displaceable element and biasing elements, position P1 can, in some cases, correspond to a no-flow condition or pressurized gas flow condition through control device 500 that is below a predetermined flow rate or pressurized gas flow threshold.

During use in fluid communication with an elongated gas damping passage in accordance with the subject matter of the present disclosure, such as one or more of passages 324 and/or 444, for example, displaceable element 536 can float or otherwise move in response to pressurized gas flow within passage 528. For example, as pressurized gas flows into, out of and/or otherwise within control device from a direction represented by arrow FL1, displaceable element 536 can undergo movement within passage 528 in the direction represented by arrow MV1. Oppositely, as pressurized gas flows into, out of and/or otherwise within control device from a direction represented by arrow FL2, displaceable element can undergo movement within passage 528 in the direction represented by arrow MV2. Under pressurized gas flow conditions corresponding to higher frequency, lower amplitude vibrations (e.g., higher velocity, lower gas volume displacement), displaceable element 536 can float or otherwise move within passage 528 together as the pressurized gas is displaced within passage 528. Under pressurized gas flow conditions corresponding to lower frequency, higher amplitude vibrations (e.g., lower velocity, higher gas volume displacement), displaceable element 536 can be displaced to, from and between end positions P2 and P3. During such conditions of use, displaceable element 536 can function for a brief or instantaneous period as a fixed orifice with damping generated due to pressurized gas flow through orifice 542.

Figure 5:
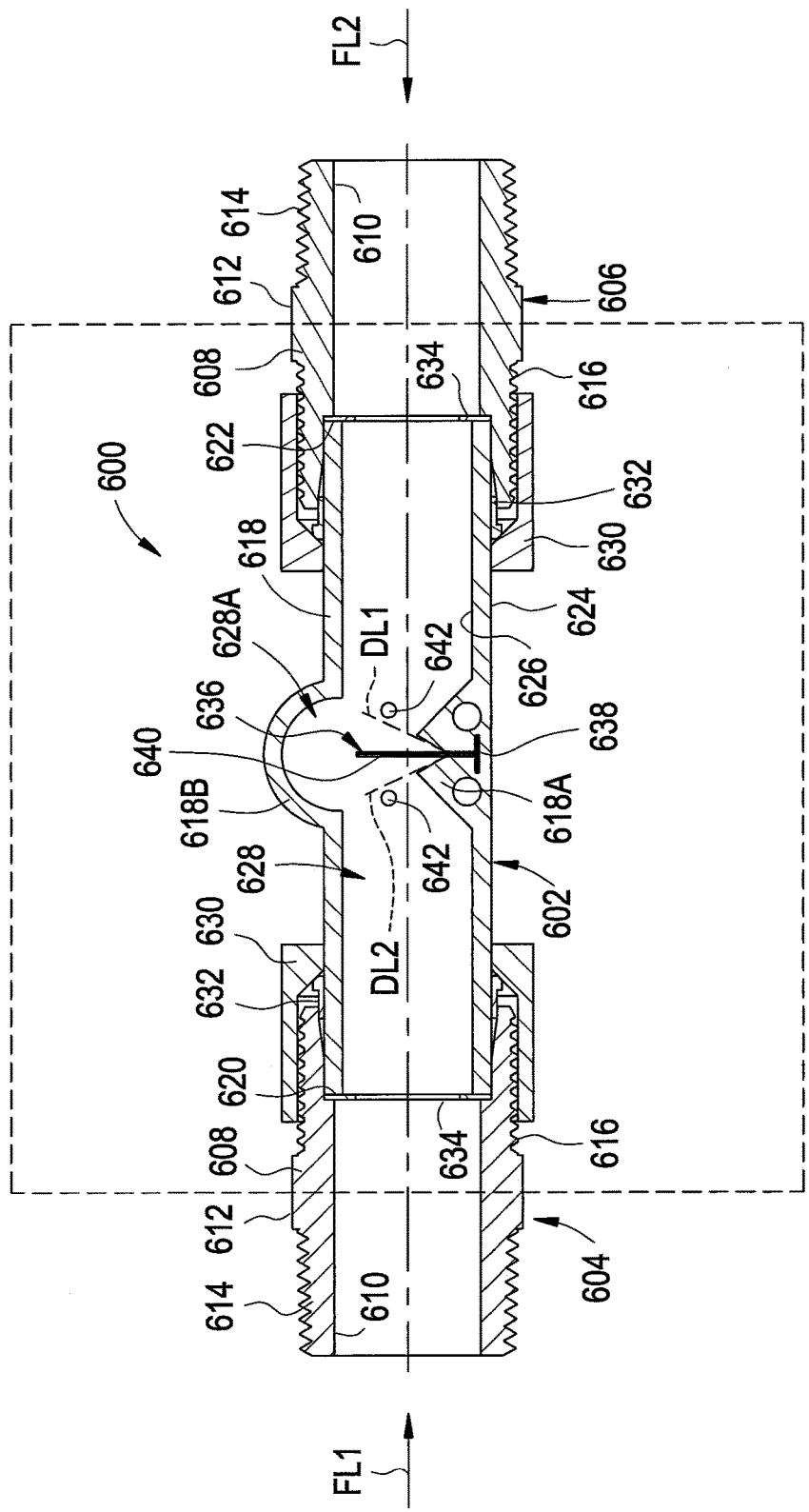
FIG. 5 is a cross-sectional side view of another example of a control device suitable for use in fluid communication along an elongated gas damping passage in accordance with the subject matter of the present disclosure.

Another example of a control device 600 that is suitable for use as one or more of control devices CD1, CD2 and/or CD3 is shown in FIG. 5 as including a housing 602 that is operatively secured to connector fittings 604 and 606 in a manner suitable for forming a substantially fluid-tight connection between housing 602 and the connector fittings. In the arrangement shown in FIG. 4, connector fittings 604 and 606 are disposed along opposing ends of the control device. It will be appreciated that connector fittings 604 and 606 can be dimensioned and configured for securement in fluid communication on or along one of the elongated gas damping passages, such as one or more of passages 324 and/or 444, for example, in any suitable manner. For example, connector fittings 604 and 606 can include a fitting wall 608 that includes an inner surface 610 and an outer surface 612. The connector fittings can include at least one helical thread formed along at least one of the opposing ends of the fitting wall. In the arrangement shown, connector fittings 604 and 606 include helical threads 614 and 616 formed along outer surface 612 of the fitting wall.

Housing 602 includes a housing wall 618 that extends lengthwise between opposing end edges 620 and 622. Housing wall 618 includes an outer surface 624 and an inner surface 626 that at least partially defines a passage 628 extending lengthwise through housing 602. In a preferred arrangement, inner surfaces 610 of connector fittings 604 and 606 are dimensioned to cooperate with inner surface 626 such that passage 628 can extend through control device

600. Connector fittings 604 and 606 can be secured on or along housing 602 in any suitable manner, such as by way of a threaded nut 630 and compression element 632, for example, that can cooperatively engage housing 602 and one of the connector fittings in a conventional manner. In some cases, a washer or other element 634 can be captured between one of end edges 620 and 622 and a corresponding one of connector fittings 604 and 606, such as may be useful for providing a shoulder surface for engaging another component and/or to further act as a sealing element between the housing and a corresponding one of the connector fittings, for example.

Control device 600 can also include a displaceable element 636 that is disposed within passage 628. Element 636 can include opposing surfaces (not numbered) facing outwardly toward end edges 620 and 622. Additionally, element 636 can extend from a mounting end 638 supported along housing wall 618 toward a distal end 640 that can be disposed within passage 628 or a chamber thereof. It will be appreciated that element 636 can be formed from combination of one or more components, which can be formed any combination of one or more materials. As one example, two or more L-shaped components formed from a metal material, such as steel, for example. The two L-shaped components can be arranged back-to-back to form element 636, which is shown as having a T-shaped configuration.

Depending upon the size, shape and configuration of element 636, the housing wall and passage can have a corresponding size, shape and configuration to permit the displaceable element to deflect under certain pressurized gas flow conditions through passage 628 and, generally, through control device 600. As one example, housing wall 618 can have a generally circular cross-sectional shape that defines a passage having a substantially cylindrical overall configuration. As another example, a portion 618A of housing wall 618 can at least partially define a mounting feature dimensioned to receive and retain mounting end 638 of element 636. Additionally, a portion 618B of housing wall 618 can project outwardly from the housing wall to at least partially form a passage chamber 628A. In some cases, housing 602 can also include one or more support posts 642 disposed in offset relation to element 636 and dimensioned to substantially inhibit excessive deflection of element 636 under certain pressurized gas flow conditions.

During use in fluid communication with an elongated gas damping passage in accordance with the subject matter of the present disclosure, such as one or more of passages 324 and/or 444, for example, displaceable element 636 can deflect in response to pressurized gas flow within and/or through passage 628. For example, as pressurized gas flows into, out of and/or otherwise within control device from a direction represented by arrow FL1, displaceable element 636 can undergo deflection within passage 628, such as is represented by deflection line DL1. Oppositely, as pressurized gas flows into, out of and/or otherwise within control device from a direction represented by arrow FL2, displaceable element 636 can undergo deflection within passage 628, such as is represented by deflection line DL2.

Under pressurized gas flow conditions corresponding to or otherwise associated with higher frequency, lower amplitude vibrations (e.g., higher velocity, lower gas volume displacement), displaceable element 636 can remain in a substantially undeflected condition, such as is illustrated in FIG. 5, for example, and pressurized gas can flow within passage 628, such as by flowing around the displaceable element through passage chamber 628A. Under pressurized gas flow conditions corresponding to lower frequency, higher amplitude vibrations (e.g., lower velocity, higher gas volume displacement), displaceable element 636 can be displaced into a deflected condition (e.g., line DL1 and/or DL2) in which the size and/or shape of effective area of passage 628 is reduced, such as may be effective to increase resistance to pressurized gas flow and thereby improve pressurized gas damping performance.

Figure 6:
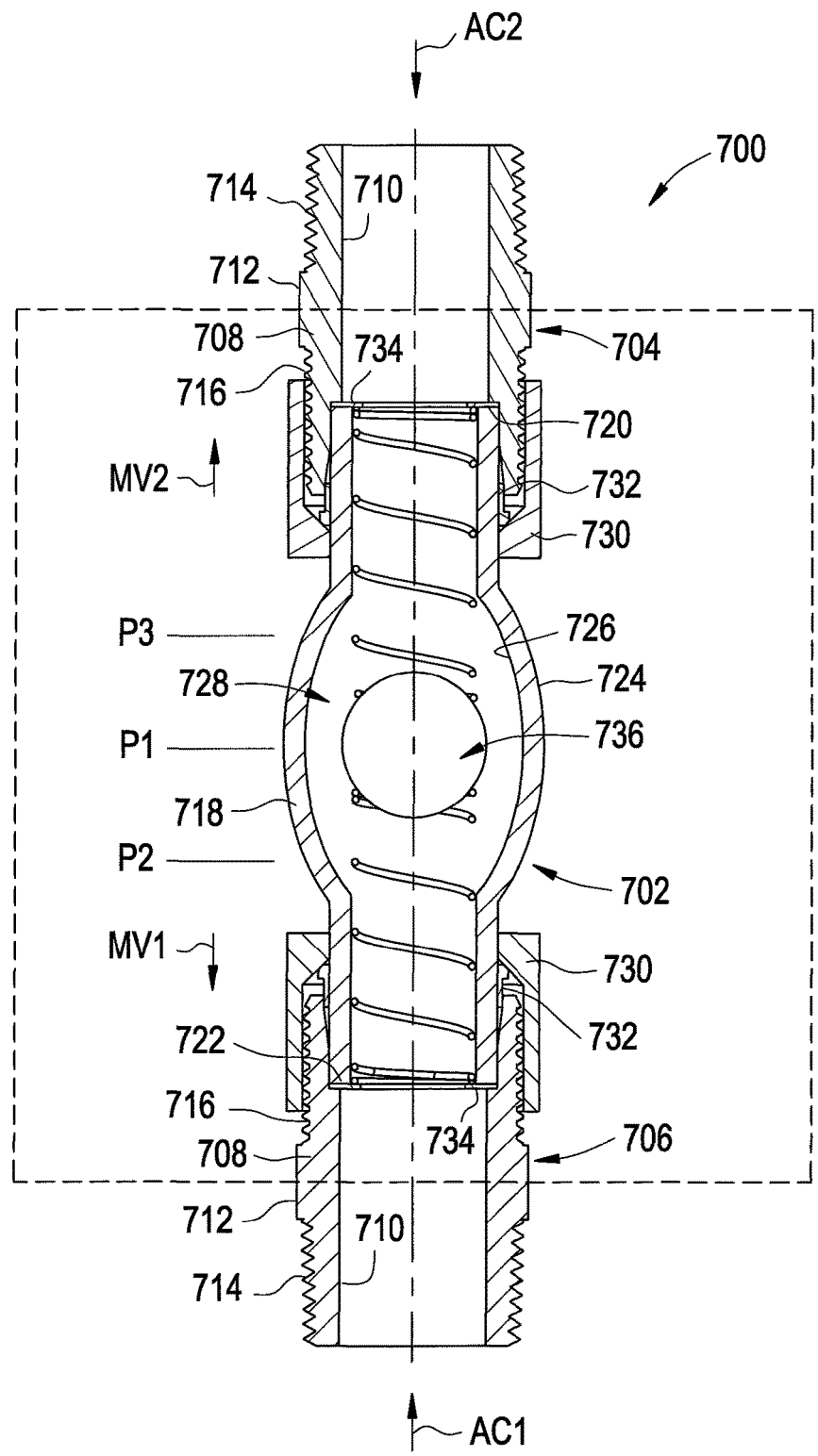
FIG. 6 is a cross-sectional side view of a further example of a control device suitable for use in fluid communication along an elongated gas damping passage in accordance with the subject matter of the present disclosure.

A further example of a control device 700 that is suitable for use as one or more of control devices CD1, CD2 and/or CD3 is shown in FIG. 6 as including a housing 702 that is operatively secured to connector fittings 704 and 706 in a manner suitable for forming a substantially fluid-tight connection between housing 702 and the connector fittings. In the arrangement shown in FIG. 6, connector fittings 704 and 706 are disposed along opposing ends of the control device. It will be appreciated that connector fittings 704 and 706 can be dimensioned and configured for securement in fluid communication on or along one of the elongated gas damping passages, such as one or more of passages 324 and/or 444, for example, in any suitable manner. For example, connector fittings 704 and 706 can include a fitting wall 708 that includes an inner surface 710 and an outer surface 712. The connector fittings can include at least one helical thread formed along at least one of the opposing ends of the fitting wall. In the arrangement shown, connector fittings 704 and 706 include helical threads 714 and 716 formed along outer surface 712 of the fitting wall.

Housing 702 includes a housing wall 718 that extends lengthwise between opposing end edges 720 and 722. Housing wall 718 includes an outer surface 724 and an inner surface 726 that at least partially defines a passage 728 extending lengthwise through housing 702. In a preferred arrangement, inner surfaces 710 of connector fittings 704 and 706 are dimensioned to cooperate with inner surface 726 such that passage 728 can extend through control device 700. Connector fittings 704 and 706 can be secured on or along housing 702 in any suitable manner, such as by way of a threaded nut 730 and compression element 732, for example, that can cooperatively engage housing 702 and one of the connector fittings in a conventional manner. In some cases, a washer or other element 734 can be captured between one of end edges 720 and 722 and a corresponding one of connector fittings 704 and 706, such as may be useful for providing a shoulder surface for engaging another component and/or to further act as a sealing element between the housing and a corresponding one of the connector fittings, for example.

Control device 700 can also include a displaceable element 736 that is disposed within passage 728. Element 736 can include an outer surface 738 dimensioned for receipt within passage 728. Control device 700 can further include biasing elements 740 and 742 that are disposed along opposing sides of displaceable element 736 and engage a shoulder surface (not numbered), such as can be formed by washer elements 734, for example. Biasing elements 740 and 742 can permit displaceable element 736 to move within passage 728 under the influence of dynamic inputs that may be acting on one or more components and/or elements of the gas spring and gas damper assembly. As one example, displaceable element 736 can be displaced under the influence of accelerations acting on an end member (e.g., end member 400) of the gas spring and gas damper assembly. In this respect, control device 700 can differ from control devices 500 and 600, which, as discussed above, can provide pressurized gas performance in response to pressurized gas flow into, out of or otherwise within the control devices.

In some cases, biasing elements 740 and 742 can maintain displaceable element 736 in a central position within passage 728, which is represented in FIG. 6 by reference number P1. Depending upon various features and/or characteristics of the control device, displaceable element and biasing elements, position P1 can, in some cases, correspond to a static or dynamic input condition associated with control device 700 that is below a predetermined acceleration or other dynamic input threshold.

During use in fluid communication with an elongated gas damping passage in accordance with the subject matter of the present disclosure, such as one or more of passages 324 and/or 444, for example, displaceable element 736 can float or otherwise move in response to pressurized gas flow within passage 728 and/or in response to dynamic inputs acting on the control device. For example, as an acceleration or other dynamic input exceeding a predetermined threshold value acts on control device 700 in a direction represented by arrow AC1, displaceable element 736 can undergo movement within passage 728 in the direction represented by arrow MV1 toward position P2. Oppositely, as an acceleration or other dynamic input exceeding a predetermined threshold value acts on control device 700 in a direction represented by arrow AC2, displaceable element can undergo movement within passage 728 in the direction represented by arrow MV2 toward position P3.

Figure 7:
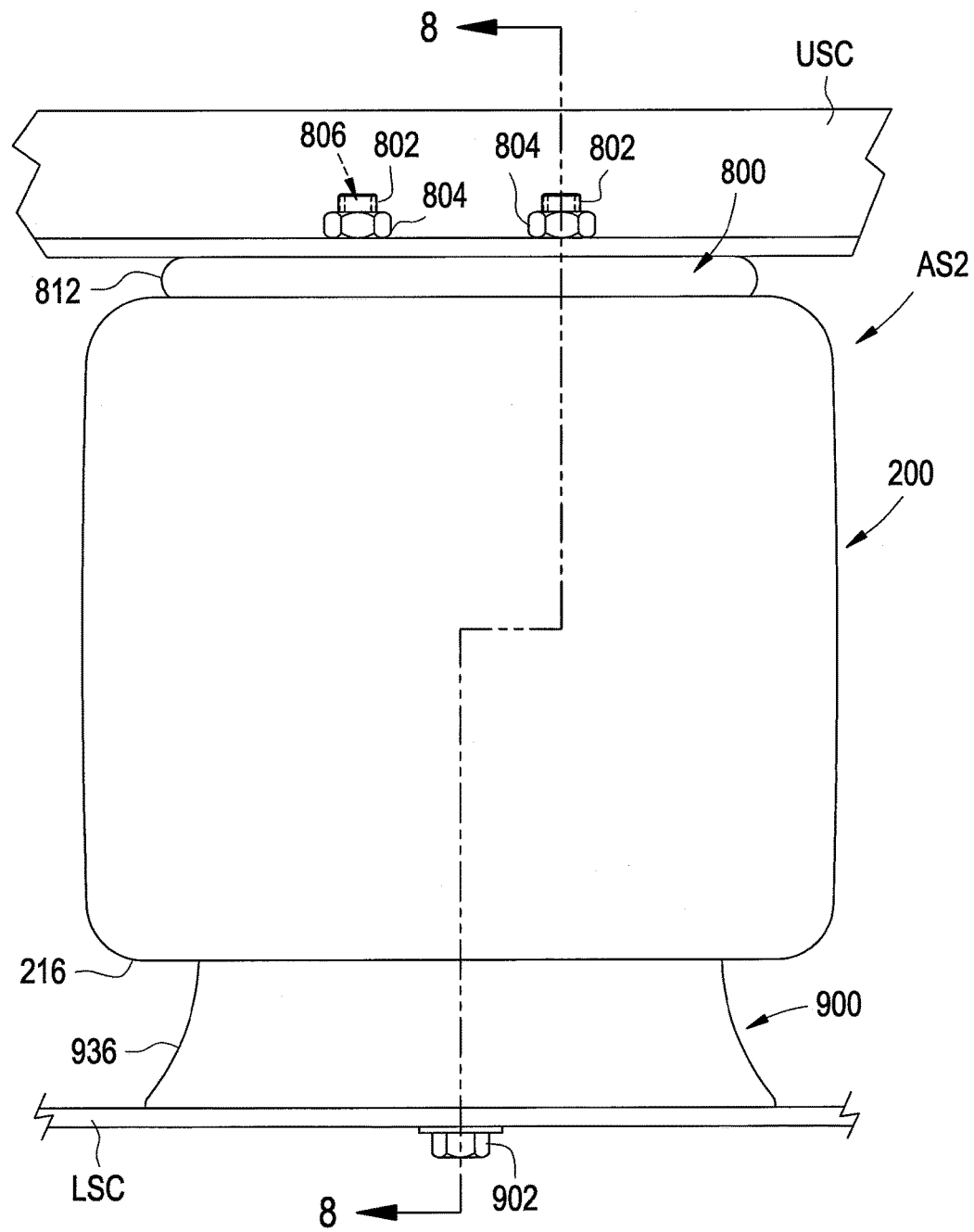
FIG. 7 is a side view of another example of a gas spring and gas damper assembly in accordance with the subject matter of the present disclosure.
Figure 8:
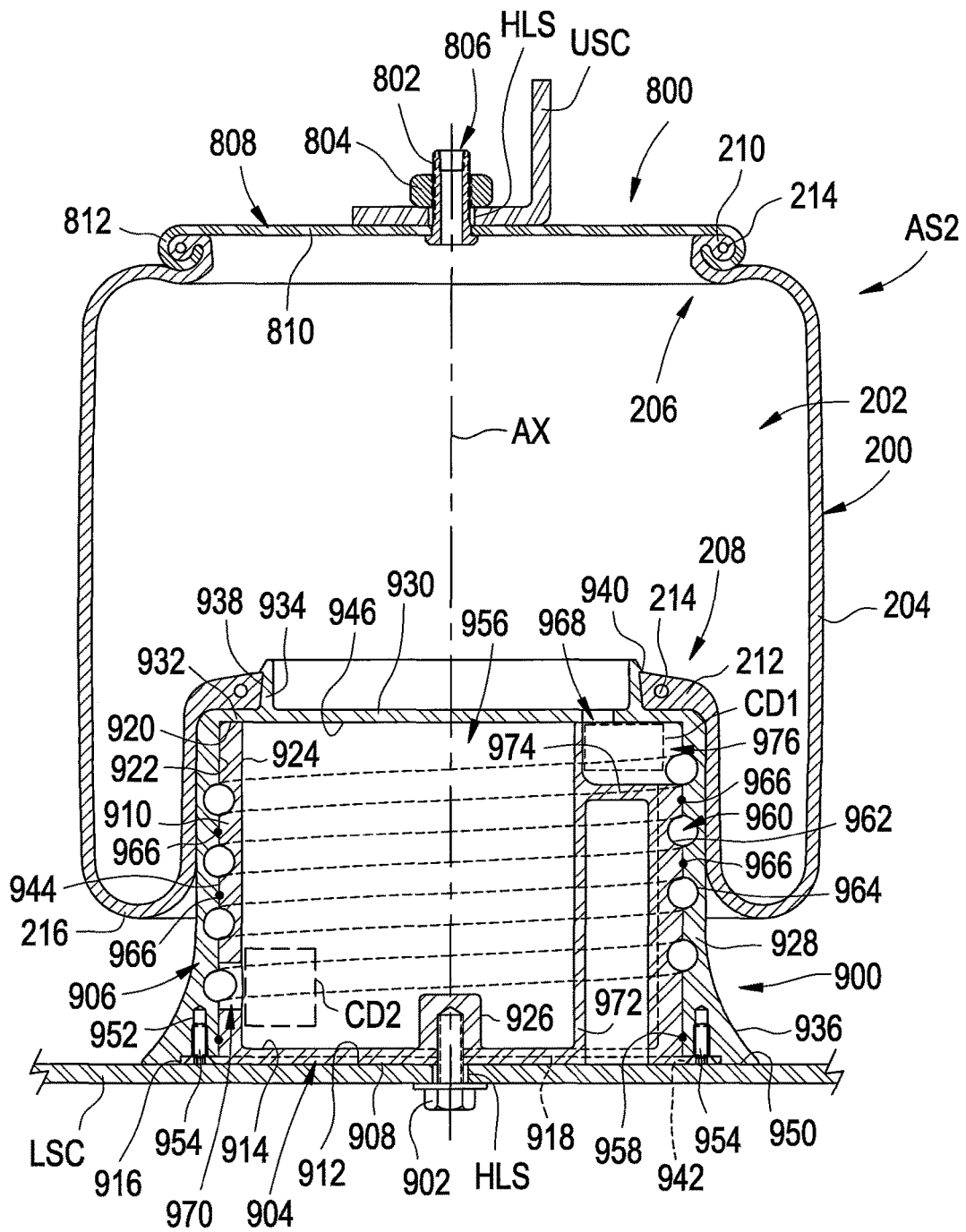
FIG. 8 is a cross-sectional side view of the gas spring and gas damper assembly in FIG. 7 taken from along line 8-8 therein.
Figure 9:
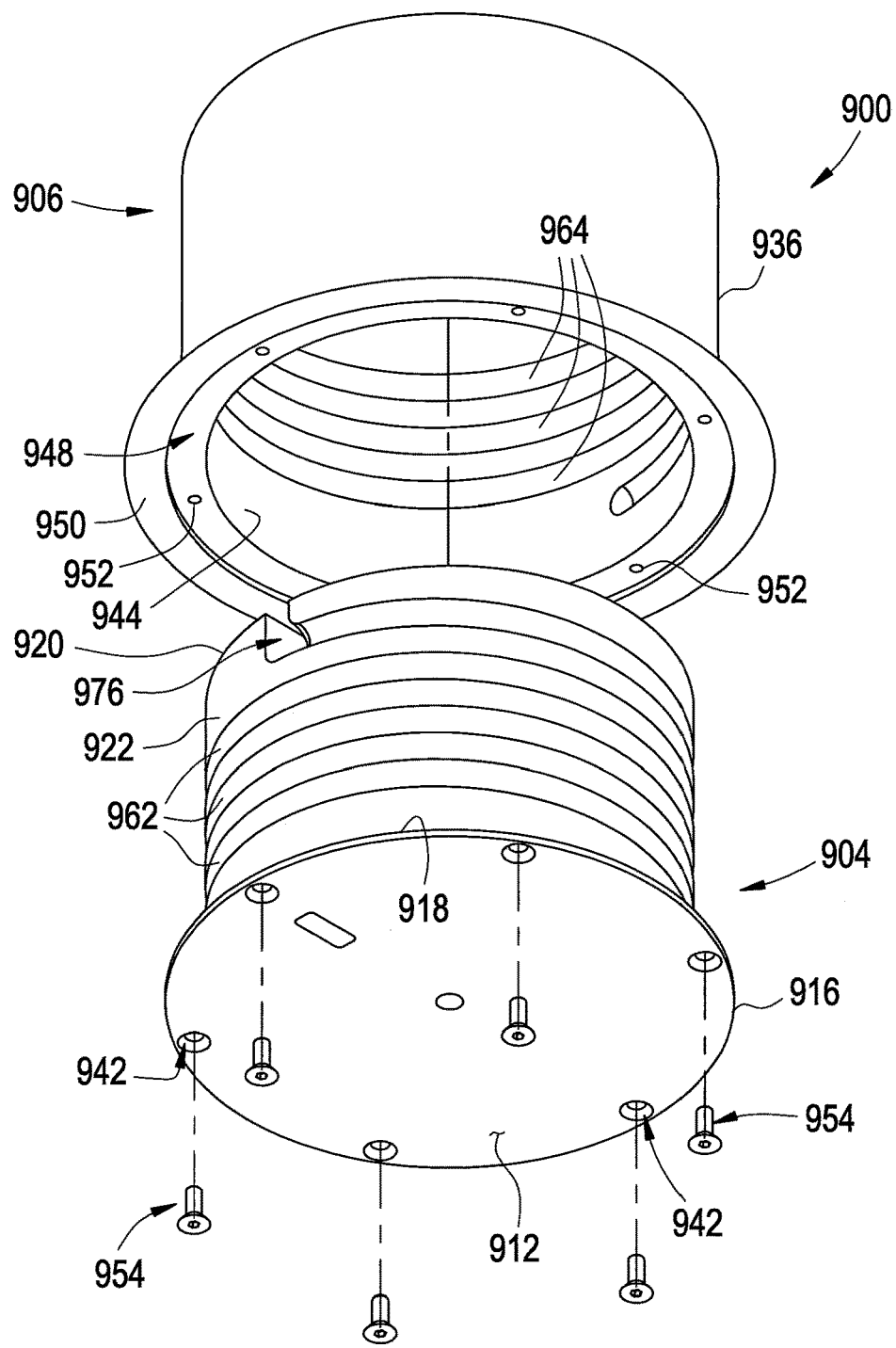
FIG. 9 is a bottom perspective view of the end member in FIGS. 7 and 8 including an internal elongated gas damping passage.

Another example of a gas spring and gas damper assembly AS2 in accordance with the subject matter of the present disclosure, such as may be suitable for use as gas spring and gas damper assemblies 102, for example, is shown in FIGS. 7-9. Gas spring and gas damper assembly AS2 is shown as having a longitudinally-extending axis AX (FIG. 8) and can include one or more end members, such as an end member 800 and an end member 900 that is spaced longitudinally from end member 800. Flexible spring member 200, such as has been described in detail above, can extend peripherally around axis AX and can be secured between the end members in a substantially fluid-tight manner such that spring chamber 202 (FIG. 8) is at least partially defined therebetween.

Gas spring and gas damper assembly AS2 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIGS. 7 and 8, for example, end member 800 can be secured on or along a first or upper structural component USC, such as associated vehicle body BDY in FIG. 1, for example, and can be secured thereon in any suitable manner. For example, one or more securement devices, such as mounting studs 802, for example, can be included along end member 800. In some cases, the one or more securement devices (e.g., mounting studs 802) can project outwardly from end member 800 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 804 or other securement devices, for example. As an alternative to one or more of mounting studs 802, one or more threaded passages (e.g., blind passages and/or through passages) could be used in conjunction with a corresponding number of one or more threaded fasteners.

Additionally, one or more fluid communication ports, such as transfer passages 806, for example, can, optionally, be provided to permit fluid communication with spring chamber 202, such as may be used for transferring pressurized gas into and/or out of the spring chamber, for example. In the exemplary embodiment shown, transfer passages 806 extend through at least one of mounting studs 802 and are in fluid communication with spring chamber 202. It will be appreciated, however, that any other suitable fluid communication arrangement could alternately be used.

End member assembly 900 can be secured on or along a second or lower structural component LSC, such as an axle AXL in FIG. 1, for example, in any suitable manner. As one example, lower structural component LSC could include one or more mounting holes HLS extending therethrough. In such case, a threaded fastener 902 could extend through one of mounting holes HLS and threadably engage end member 900 or another component of the assembly to secure the end member on or along the lower structural component.

Flexible spring member 200 has been described above in detail. Accordingly, a description of flexible spring member 200 is not repeated here. However, it is to be recognized and understood that the foregoing description of flexible spring member as well as the features, components, construction and materials thereof is equally applicable to the arrangement shown in FIGS. 7 and 8.

It will be appreciated that the end members and/or end member assemblies can be of any suitable type, kind, construction and/or configuration, and can be operatively connected or otherwise secured to the flexible spring member in any suitable manner. In the exemplary arrangement shown in FIGS. 7 and 8, for example, end member 800 is of a type commonly referred to as a bead plate and includes an end member wall 808 with a central wall portion 810 (FIG. 8) and an outer peripheral wall portion 812. End member 800 is disposed along end 206 of flexible wall 204 with outer peripheral wall portion 812 crimped or otherwise deformed around at least a portion of mounting bead 210 such that a substantially fluid-tight seal can be formed between flexible spring member 200 and end member 800.

It will be appreciated that end member 900 can be of any suitable size, shape, configuration and/or construction, and can include any suitable combination of features, elements and/or components. For example, end member 900 is shown as being of a type commonly referred to as a piston (or a roll-off piston), and can include a base section 904 and a shell section 906 that cooperatively engages base section 904 such that the shell section can be supported on or otherwise operatively connected to the base section. Additionally, base section 904 and shell section 906 can be attached or otherwise secured to one another in a manner suitable for securement of the end member on or along an associated structural component, such as along lower structural component LSC by way of threaded fastener 902, for example.

Base section 904 is shown in FIGS. 8 and 9 as including a base wall 908 that extends generally transverse to axis AX and a side wall 910 that project from along base wall 908 in a generally axial direction. Base wall 908 can have a surface 912 disposed in facing relation to lower structural component LSC and a surface 914 facing toward end member 800. In some cases, base wall 908 can include an outer peripheral edge 916 that is disposed radially outward of side wall 910 and can include an outer shoulder surface 918 facing opposite surface 912. Side wall 910 can extend from along base wall 908 toward a distal end surface 920 and can include an outer surface 922 and an inner surface 924. In some cases, one or more securement features can be provided on or along base section 904, such as may be suitable for securement of the base section to an associated structural component. As one example, a boss 926 can project from along surface 914 of base wall 908 in a direction toward end member 800. The boss can include one or more helical threads or other securement features, such as may be suitable for receivingly engaging an associated securement device, such as threaded fastener 902, for example. In such case, threaded fastener 902 can extend through one of mounting holes HLS in lower structural component LSC and threadably engage boss 924 of base section 904 or another feature or component of end member 900 to secure the end member on or along the lower structural component. It will be appreciated, however, that other configurations and/or constructions could alternately be used.

Shell section 906 can include a side wall portion 928 and a partition wall portion 930. In some cases, shell section 906 of end member 900 can also include an end wall portion 932 and a side wall portion 934. It will be recognized that a wide variety of sizes, shapes, profiles and/or configurations can and have been used in forming end members of the type and kind referred to as pistons or roll-off pistons, such as end member 900, for example. As such, it will be appreciated that the wall portions of the end member (e.g., side wall portion 928) can be of any suitable shape, profile and/or configuration, such as may be useful to provide one or more desired performance characteristics, for example, and that the profile shown in FIGS. 7-9 is merely exemplary. Side wall portion 928 of end member 900 has an outer surface 936 that abuttingly engages flexible spring member 200 such that rolling lobe 216 is formed along flexible wall 204. As gas spring and gas damper assembly AS2 is displaced between compressed and extended conditions, rolling lobe 216 can be displaced along outer surface 936 in a generally conventional manner.

As indicated above, it will be appreciated that the one or more end members of the gas spring and gas damper assembly can be operatively connected or otherwise secured to the flexible spring member in any suitable manner. For example, shell section 906 of end member 900 can include side wall portion 934 that extends longitudinally-outwardly beyond partition wall portion 930 and/or end wall portion 932, and extends peripherally about axis AX. It will be appreciated that side wall portion 934 can be secured to one or more other wall portions of shell section 906 in any suitable manner. As one example, side wall portion 934 can be integrally formed as a part of shell section 906, for example. In some cases, side wall portion 934 can be positioned such that end wall portion 932 extends radially outward from the side wall portion toward side wall portion 928 and partition wall portion 930 extends radially inward from along side wall portion 934.

Additionally, side wall portion 934 can have an outer surface 938 that is dimensioned to receive mounting bead 212 of end 208 of flexible wall 204 such that a substantially fluid-tight seal can be formed therebetween. In some cases, a retaining ridge 940 can project radially outward from along the side wall portion 934 and can extend peripherally along at least a portion thereof, such as may assist in retaining end 208 of flexible wall 204 in abutting engagement on or along the side wall portion.

It will be appreciated that base section 904 and shell section 906 can be secured to one another in any suitable manner. In a preferred arrangement, the base and shell sections can be secured to one another in a manner suitable for retaining the shell section on or along the associated end member (e.g., lower structural component LSC). In the exemplary arrangement shown in FIGS. 8 and 9, base section 904 includes a plurality of holes 942 extending through base wall 908 adjacent outer peripheral edge 916.

Side wall portion 934 can include an inner surface 944 dimensioned to receive outer surface 922 of side wall 910 of base section 904. In some cases, distal end surface 920 of side wall 910 can be disposed in abutting engagement with a surface 946 of partition wall portion 930 and/or end wall portion 932. Additionally, in some cases, shell section 902 can include a recess 948 (FIG. 9) extending into side wall portion 934 from along an end surface 950. A plurality of securement features, such as threaded holes 952 can extend into side wall portion 934 from along end surface 950. In a preferred arrangement, one or more of threaded holes 952 can be at least approximately aligned with one or more of holes 942 such that securement devices, such as a plurality of threaded fasteners 954 can be used to secure base section 904 and shell section 906 to one another. It will be appreciated, however, that other configurations and/or arrangements could alternately be used.

It will be appreciated that a gas spring and gas damper assembly in accordance with the subject matter of the present disclosure (e.g., assemblies 102 and/or AS1) can include any number of one or more additional features, components and/or devices. For example, gas spring and gas damper assembly AS2 can, optionally, include a jounce bumper (not shown) supported on one of the end members and suitable for inhibiting direct contact between the end members and/or transferring axially-applied loads or forces between the end members. It will be appreciated that the jounce bumper, if included, can be of any suitable size, shape and/or construction, and can be secured on or along the associated end member in any suitable manner, such as has been described above in connection with FIG. 3, for example.

As described above, one or more of the end members of a gas spring and gas damper assembly in accordance with the subject matter of the present disclosure can include a damper volume, damper reservoir and/or other damping chamber that is separate from the spring chamber (e.g., spring chamber 202) but that is capable of being placed in fluid communication with the spring chamber such that pressurized gas damping can be generated as a result of pressurized gas flow between the spring chamber and the volume, reservoir or other chamber of the one or more end members. In the arrangement shown in FIG. 8, for example, end member 900 includes a damper reservoir 956 that is at least partially formed by one or more walls and/or wall portions of the end member. In the arrangement shown in FIG. 8, for example, damper reservoir 956 is at least partially defined by inner surface 914 of base wall 908 and inner surface 924 of side wall 910. Additionally, damper reservoir 956 is at least partially defined by surface 946 of partition wall portion 930 and/or end wall portion 932. It will be appreciated, however, that other configurations and/or arrangements could alternately be used.

In some cases, it may be desirable to maintain a substantially fluid-tight interface between base section 904 and shell section 906 to inhibit or at least reduce pressurized gas loss from between the two sections. It will be appreciated that such a substantially fluid-tight interface can be achieved in any suitable manner, such as by providing one or more sealing elements 958 in sealing engagement between the sections of end member 900. Additionally, or in the alternative, a flowed-material joint (not shown) could be formed in a suitable manner between the sections of end member 900. It will be appreciated, however, that other configurations and/or constructions could alternately be used.

As indicated above, a gas spring and gas damper assembly in accordance with the subject matter of the present disclosure can include one or more elongated gas damping passages fluidically connected between the spring chamber and one or more gas damper reservoirs. In some cases, the one or more elongated gas damping passages can be at least partially formed by one or more lengths of tubular material that are connected in fluid communication between the spring chamber and a corresponding one or more pressurized gas damper reservoirs. Alternately, as shown in FIGS. 8 and 9, for example, at least a portion of an elongated gas damping passage can be provided that is internal to or otherwise at least partially defined by one or more walls or wall portions of an end member.

In the arrangement shown in FIGS. 8 and 9, for example, end member 900 includes an elongated gas damping passage 960 that is at least partially defined by at least one of base section 904 and shell section 906. As one example, a groove or channel can be formed along the outer surface of the side wall of the base section that can cooperate with an inner surface of the side wall portion of the shell section to at least partially form an elongated gas damping passage. As another example, a groove or channel can be formed along the inner surface of the side wall portion of the shell section that can cooperate with an outer surface of the side wall of the base section to at least partially form an elongated gas damping passage. In the arrangement shown, a groove or channel 962 is formed along outer surface 922 of side wall 910 of base section 904, and a groove or channel 964 is formed along inner surface 944 of side wall portion 928 of shell section 906.

In an assembled condition of end member 900, shell section 906 is received on base section 904 such that inner and outer surfaces 944 and 922 are disposed adjacent one another. In a preferred arrangement, a close fit between the inner and outer surfaces can be used to minimize or at least reduce the size of any gap that may exist between the inner and outer surfaces. In this manner, pressurized gas flow through the end member, other than through passage 960, can be minimized or at least reduced. In some cases, one or more sealing elements 966 could be disposed between base section 904 and shell section 906 in a suitable manner, such as may substantially inhibit or at least further reduce the inadvertent pressurized gas transfer therebetween.

As discussed above, the elongated gas damping passage (e.g., passage 960) will have an overall length (not represented) and a cross-sectional shape with a maximum cross-sectional dimension (e.g., reference dimension DM in FIG. 3), for example. In the arrangement shown in FIGS. 7-9, groove 962 of base section 904 and groove 964 of shell section 906 cooperate to form elongated gas damping passage 960. It will be appreciated that the cross-sectional shape or profile of grooves 962 and 964 can be of any suitable form or configuration. In the arrangement shown, grooves 962 and 964 have an approximately semi-circular profile that results in passage 960 having an approximately circular cross-sectional shape. It will be appreciated, however, that other configurations and/or arrangements could alternately be used. Non-limiting examples of suitable cross-sectional shapes for the grooves that at least partially form an elongated gas damping passage (e.g., passage 960) can include approximately circular, ovoid, elliptical, rectangular, square and/or other curved or polygonal shapes. In some cases, the cross-sectional shape may be substantially uniform along the length of the passage. In other cases, different sections or portions of the elongated gas damping passage can have different cross-sectional shapes.

Additionally, it will be appreciated that the one or more elongated gas damping passages (e.g., passage 960) can be configured or otherwise arranged within the end member (e.g., end member 900) in any suitable manner, such as by having one or more portions or sections that are linear, helical, curved, serpentine (axially and/or radially) or any combination of these and/or other configurations and/or arrangements. In some cases, performance benefits may be achieved by using a coiled or helical arrangement in comparison with other configurations. As such, elongated gas damping passage 960 is shown as including a plurality of loops that are disposed in a helical arrangement. It will be appreciated, however, that other configurations and/or arrangements could alternately be used.

Elongated gas damping passage 960 can be disposed in fluid communication with spring chamber 202 in any suitable manner, such as by way or an opening or port 968 extending through partition wall 930, for example. Additionally, the elongated gas damping passage can be disposed in fluid communication with damping reservoir 956 in any suitable manner, such as by way of opening or port 970 extending through side wall 910, for example. In some cases, one or more of base section 904 and/or shell section 906 can include one or more additional walls and/or wall portions that can at least partially define one or more additional features and/or chambers. As one example, base section 904 includes an interior wall portion 972 and a chamber wall portion 974 that together with shell section 906 at least partially define a chamber 976 disposed in fluid communication between port 968 and passage 960. In some cases, a control device CD1 can be at least partially housed within chamber 976 and connected in fluid communication between port 968 and passage 960. Additionally, or in the alternative, a control device CD2 can be disposed in fluid communication with passage 960 by way of port 970. It will be appreciated that any suitable type, kind and/or combination of control devices can be used, such as one or more of control devices 500, 600 and/or 700, such as have been described above, for example.

Generally, elongated gas damping passage 960 can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, the elongated gas damping passage can be configured such that such pressurized gas damping can be targeted to dissipate vibrations and/or other dynamic inputs having a particular, predetermined natural frequency or within a particular, predetermined range of frequencies, such as has been described above in detail.

Figure 10:
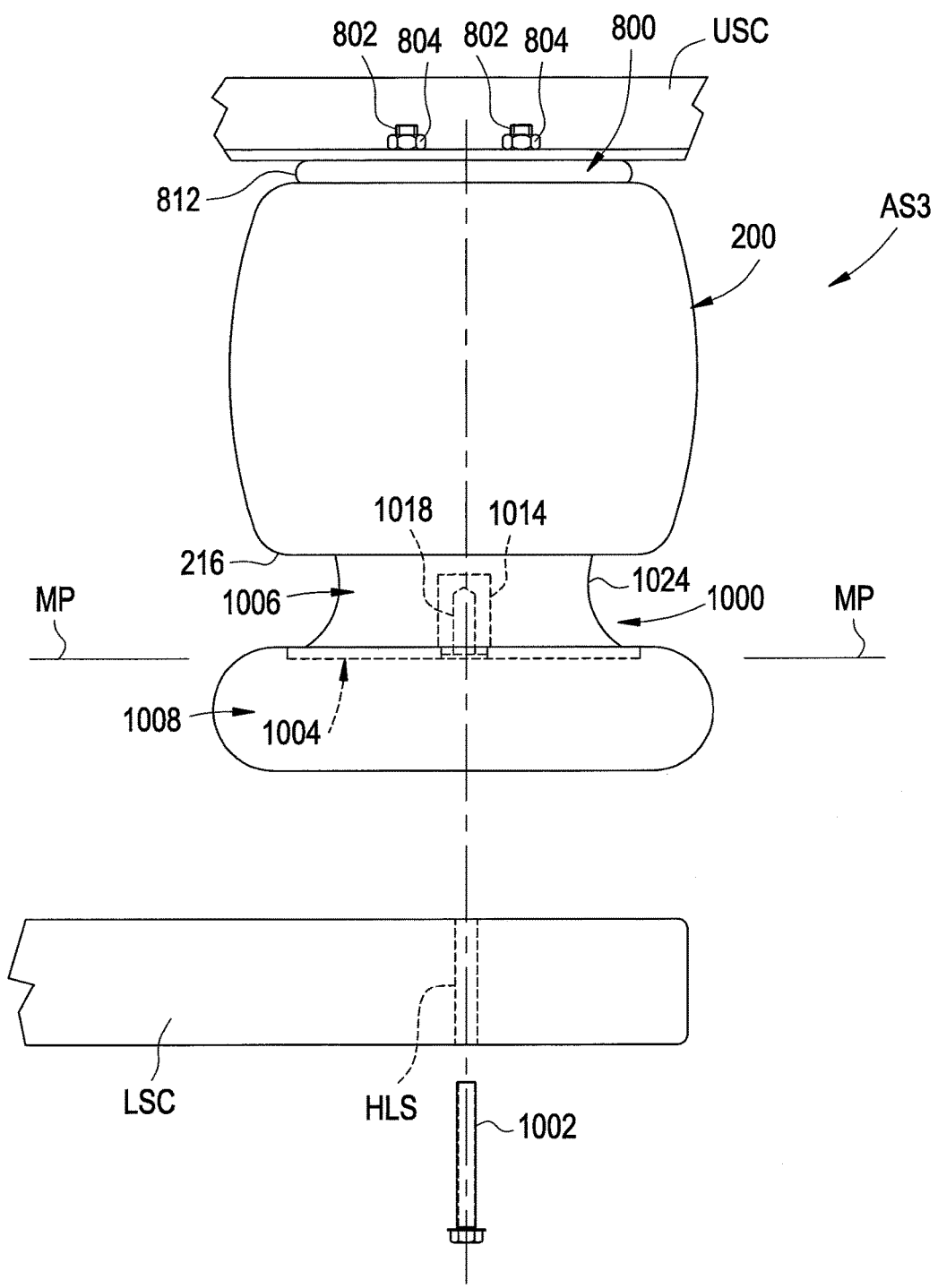
FIG. 10 is a side view of a further example of a gas spring and gas damper assembly in accordance with the subject matter of the present disclosure shown prior to assembly on an associated structural component.
Figure 11:
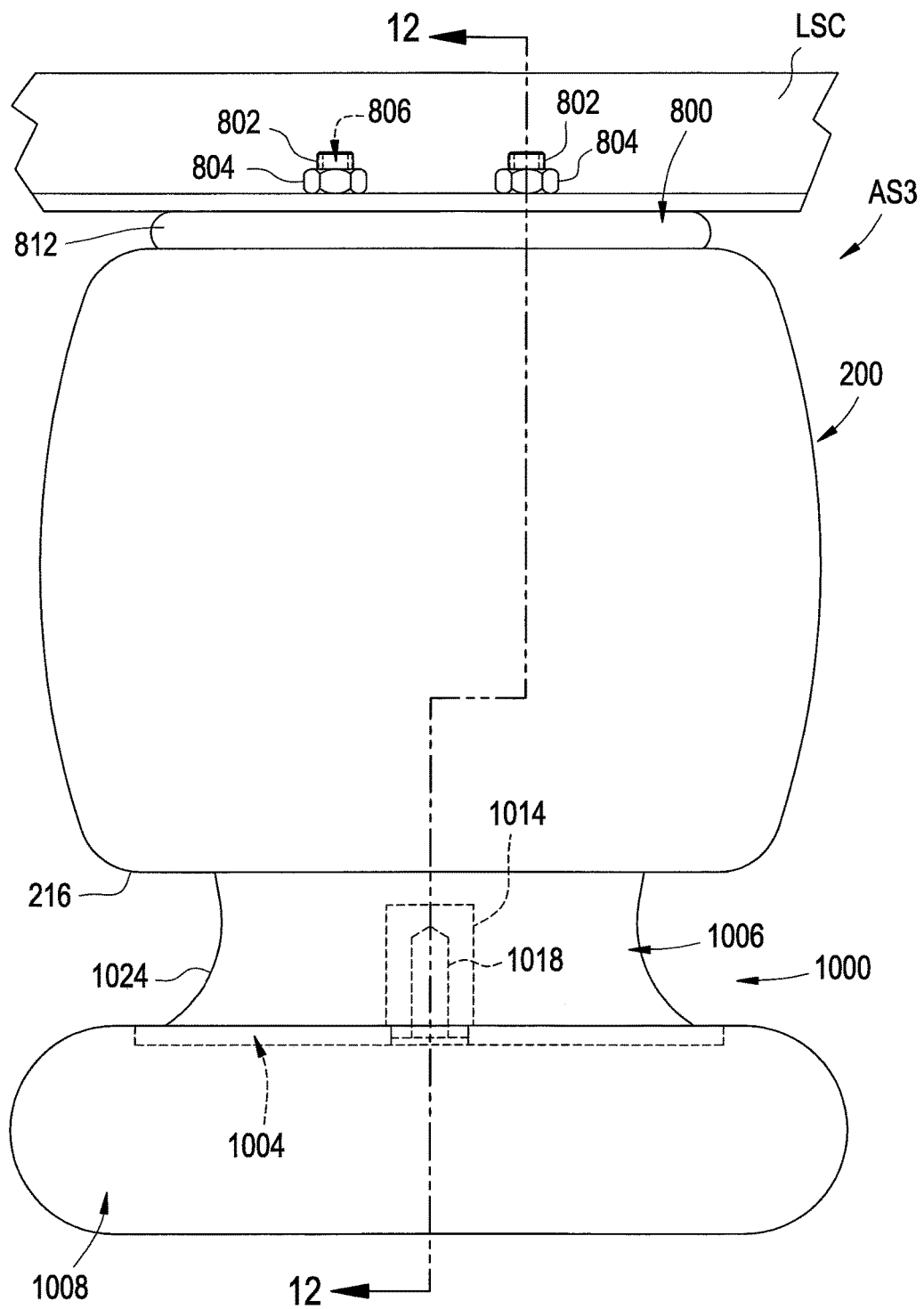
FIG. 11 is a side view of the gas spring and gas damper assembly shown in FIG. 10.
Figure 12:
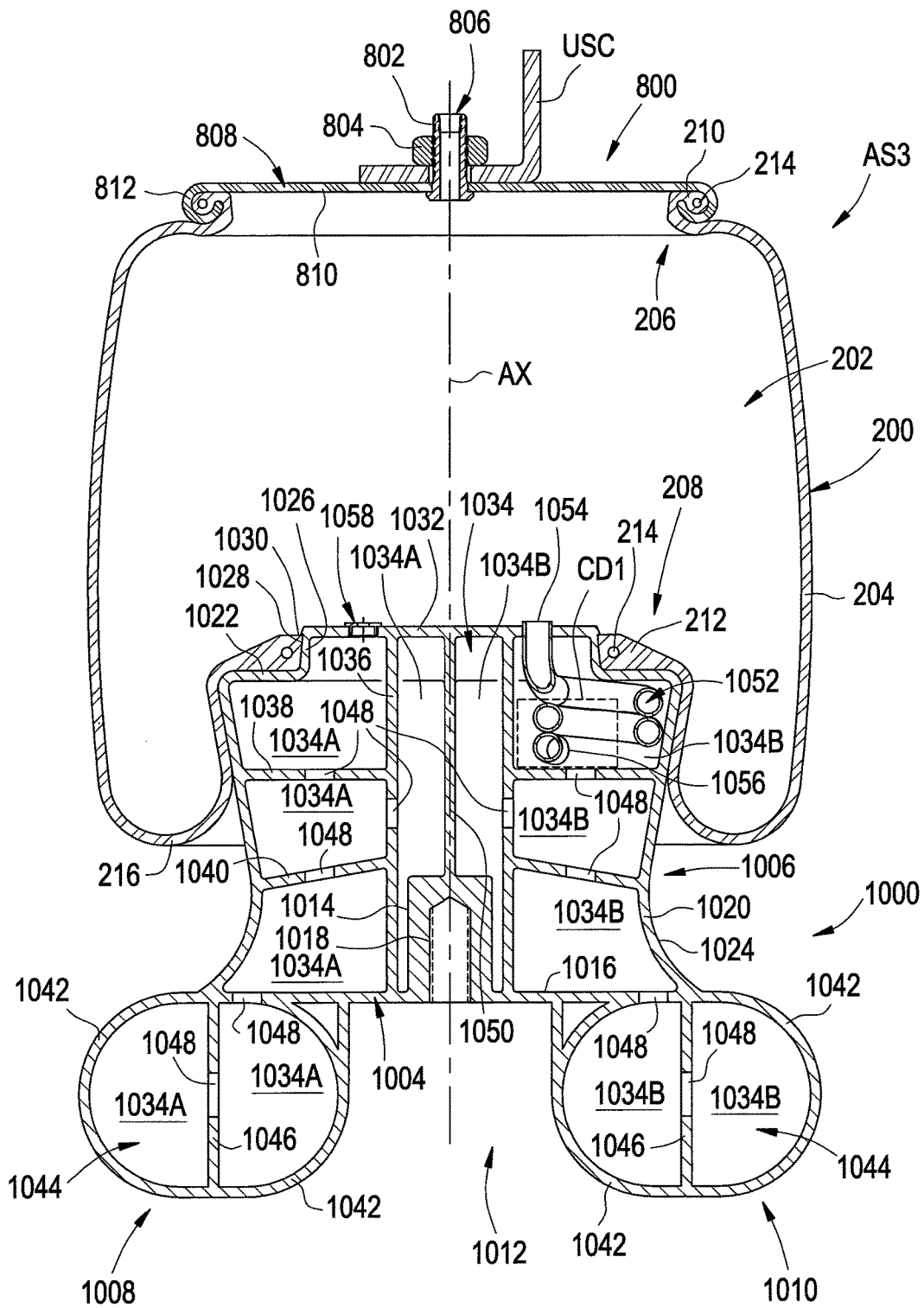
FIG. 12 is a cross-sectional side view of the gas spring and gas damper assembly in FIGS. 10 and 11 taken from along line 12-12 in FIG. 11.

A further example of a gas spring and gas damper assembly AS3 in accordance with the subject matter of the present disclosure, such as may be suitable for use as gas spring and gas damper assemblies 102, for example, is shown in FIGS. 10-12. Gas spring and gas damper assembly AS3 can have a longitudinally-extending axis AX and can include one or more end members, such as an end member 800, such as has been described in detail above, and an end member 1000 that is spaced longitudinally from end member 800. Flexible spring member 200, such as has been described in detail above, can extend peripherally around axis AX and can be secured between the end members in a substantially fluid-tight manner such that spring chamber 202 (FIG. 12) is at least partially defined therebetween.

Gas spring and gas damper assembly AS3 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIGS. 10-12, for example, end member 800 can be secured on or along a first or upper structural component USC, such as associated vehicle body BDY in FIG. 1, for example, and can be secured thereon in any suitable manner, such as has been described above in detail. Accordingly, a further description end member 800 and the operative connection thereof to upper structural component USC is not repeated here. However, it is to be recognized and understood that the foregoing description of end member 800 as well as the features, components, construction and materials thereof is equally applicable to the arrangement shown in FIGS. 10-12.

Additionally, flexible spring member 200 has been described above in detail. Accordingly, a description of flexible spring member 200, the operative connection thereof with end member 800 and the fluid communication between transfer passages 806 and spring chamber 202 are not repeated here. However, it is to be recognized and understood that the foregoing description of flexible spring member 200 as well as the features, components, construction and materials thereof is equally applicable to the arrangement shown in FIGS. 10-12.

End member assembly 1000 can be secured on or along a second or lower structural component LSC, such as an axle AXL in FIG. 1, for example, in any suitable manner. As one example, lower structural component LSC could include one or more mounting holes HLS extending therethrough. In such case, a threaded fastener 1002 could extend through one of mounting holes HLS and threadably engage end member 1000 or another component of the assembly to secure the end member on or along the lower structural component.

It will be appreciated that the end members and/or end member assemblies can be of any suitable type, kind, construction and/or configuration, and can be operatively connected or otherwise secured to the flexible spring member in any suitable manner. In the exemplary arrangement shown in FIGS. 10-12, for example, end member 1000 is of a type commonly referred to as a piston (or a roll-off piston), and can include a base wall (or base wall portion) 1004 that at least partially defines a mounting plane MP of the end member. A shell section 1006 can extend from along base wall 1004 in a direction toward end member 800. Additionally, end member 1000 can include a pair of spaced-apart reservoir sections 1008 and 1010 that extend from along base wall 1004 in a direction opposite shell section 1006 such that a recess in the form of a channel 1012 is at least partially defined along base wall 1004 between reservoir sections 1008 and 1010.

It will be appreciated that end member 1000 can be secured on or along an associated structural component (e.g., lower structural component LSC) in any suitable manner. For example, one or more securement features can be provided on or can be otherwise accessible from along base wall 1004, such as may be suitable for securement of the base section to an associated structural component. As one example, a boss 1014 can project from along an inner surface 1016 of base wall 1004 in a direction toward end member 800. The boss can include a passage 1018 with one or more helical threads or other securement features, such as may be suitable for receivingly engaging an associated securement device, such as threaded fastener 1002, for example. In such case, threaded fastener 1002 can extend through one of mounting holes HLS in lower structural component LSC and threadably engage boss 1014 or another feature or component of end member 1000 to secure the end member on or along the lower structural component. It will be appreciated, however, that other configurations and/or constructions could alternately be used.

Shell section 1006 of end member 1000 can include a side wall (or side wall portion) 1020 that extends from along base wall 1004 toward an end wall (or end wall portion) 1022 that extends generally transverse to axis AX. It will be recognized that a wide variety of sizes, shapes, profiles and/or configurations can and have been used in forming end members of the type and kind referred to as pistons or roll-off pistons, such as end member 1000, for example. As such, it will be appreciated that the wall portions of the end member (e.g., side wall portion 1020) can be of any suitable shape, profile and/or configuration, such as may be useful to provide one or more desired performance characteristics, for example, and that the profile shown in FIGS. 10-12 is merely exemplary. Side wall portion 1020 of end member 1000 has an outer surface 1024 that abuttingly engages flexible spring member 200 such that rolling lobe 216 is formed along flexible wall 204. As gas spring and gas damper assembly AS3 is displaced between compressed and extended conditions, rolling lobe 216 can be displaced along outer surface 1024 in a generally conventional manner.

As indicated above, it will be appreciated that the one or more end members of the gas spring and gas damper assembly can be operatively connected or otherwise secured to the flexible spring member in any suitable manner. For example, shell section 1006 of end member 1000 can include a side wall portion 1026 that extends longitudinally-outwardly beyond end wall portion 1022, and extends peripherally about axis AX. Side wall portion 1026 can have an outer surface 1028 that is dimensioned to receive mounting bead 212 of end 208 of flexible wall 204 such that a substantially fluid-tight seal can be formed therebetween. In some cases, a retaining ridge 1030 can project radially outward from along the side wall portion 1026 and can extend peripherally along at least a portion thereof, such as may assist in retaining end 208 of flexible wall 204 in abutting engagement on or along the side wall portion.

In some cases, a cover wall (or cover wall portion) 1032 can extend across and thereby form a closed end (not numbered) of end member 1000 generally opposite reservoir sections 1008 and 1010. It will be appreciated that any suitable configuration and/or arrangement of walls and/or wall portions can be used. As one example, cover wall 1032 extends across a distal end (not numbered) of side wall portion 1026. It will be appreciated, however, that other configurations and/or arrangements could alternately be used.

As indicated above, a gas spring and gas damper assembly in accordance with the subject matter of the present disclosure can include or be otherwise associated with at least one additional volume, reservoir and/or other chamber that is dissociated or otherwise fluidically distinguishable from the spring chamber. It will be appreciated that any combination of one or more volumes, reservoirs and/or other chambers that are internal and/or external to the gas spring and gas damper assembly can be used. For example, in some cases, one or more end members of the gas spring and gas damper assembly can at least partially define the spring chamber and can also at least partially define an additional volume, reservoir or chamber that is internal to the gas spring and gas damper assembly. It will be appreciated, however, that such one or more end members can be of any suitable type, kind, configuration and/or construction.

As one example, end member 1000 includes a damper reservoir 1034 that is at least partially defined by base wall portion 1004, side wall portion 1020, end wall portion 1022, side wall portion 1026 and/or cover wall portion 1032. In some cases, reservoir sections 1008 can 1010 can also be included in fluid communication with damper reservoir 1034, such as will be described hereinafter. Additionally, end member 1000 can include one or more additional walls or wall portions in any suitable configuration and/or combination. For example, end member 1000 can, optionally, include a central support wall (or wall portion) 1036 that can extend between base wall 1004 and cover wall 1032, such as to act as a support column, for example. End member 1000 can also, optionally, include one or more connector walls (or wall portions) 1038 and 1040 that extend between and operatively interconnect central support wall portion 1036 and side wall portion 1020, such as by extending radially therebetween.

Reservoir sections 1008 and 1010 are configured to straddle opposing sides of an associated structural component when mounted thereto. Reservoir sections 1008 and 1010 are formed from reservoir walls (or wall portions) 1042 that at least partially define reservoir extension volumes 1044. In some cases, end member 1000 can include support walls (or wall portions) 1046 that extend across one of the reservoir extension volumes and operatively interconnect portions of reservoir walls 1042 for a given reservoir section. It will be appreciated, however, that a wide variety of other configurations and/or arrangements of the end member sections could alternately be used to provide an end member with an increased reservoir volume for a given application. Additionally, end member 1000 can include a plurality of openings or ports 1048 that extend through wall portions 1004, 1036, 1038, 1040 and/or 1046 to permit fluid communication between the various chambers of damper reservoir 1034.

In some cases, end member 1000 can also include a partition wall 1050 that extends across and fluidically isolates damper reservoir 1034 into two or more damper reservoir portions. In the arrangement shown in FIG. 12, for example, partition wall separates damper reservoir 1034 into two substantially equal-sized damper reservoir portions that are formed by a plurality of reservoir and extension volume chambers 1034A and 1034B. It will be appreciated that chambers 1034A are disposed in fluid communication with one another and ports 1048 that are respectively associated therewith are preferably sized to permit chamber 1034A to act as a substantially contiguous volume. Similarly, chambers 1034B are disposed in fluid communication with one another and ports 1048 that are respectively associated therewith are preferably sized to permit chamber 1034B to act as a substantially contiguous volume. In this manner, two damper reservoirs 1034A and 1034B can be effectively provided in end member 1000.

As indicated above, a gas spring and gas damper assembly in accordance with the subject matter of the present disclosure can include one or more elongated gas damping passages fluidically connected between the spring chamber and one or more gas damper reservoirs. Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermined range of frequencies.

It will be appreciated that the one or more elongated gas damping passages can provided in any suitable manner and through the use of any suitable combination of one or more features, elements and/or components. For example, gas spring and gas damper assembly AS3 is shown in FIG. 12 as including an elongated gas damping passage 1052 that is at least substantially-entirely disposed within gas damper reservoir 1034B, and extends between a passage end 1054 disposed in fluid communication with spring chamber 202 and a passage end 1056 disposed in fluid communication with gas damper reservoir 1034B. The detailed description presented above of elongated gas damping passages 324 and 444 as well as the construction, connections and operation thereof are equally applicable to passage 1052 in FIG. 12. It will be appreciated, however, that passage 1052 can be operative to generate pressurized gas damping of vibrations at a first predetermined frequency or across a first predetermined range of frequencies, such as has been discussed above in detail.

Additionally, gas spring and gas damper assembly AS3 can, optionally, include one or more flow control systems that are operatively connected between the spring chamber and one of the one or more pressurized gas volumes, pressurized gas reservoirs and/or other pressurized gas chambers. For example, a control device CD1 can be at least partially housed within chamber 1034B and connected in fluid communication between passage end 1054 and passage end 1056. It will be appreciated that any suitable type, kind and/or combination of control devices can be used, such as one or more of control devices 500, 600 and/or 700, such as have been described above, for example. If provided, control device CD1 can be operative to generate pressurized gas damping of vibrations at a second predetermined frequency or across a second predetermined range of frequencies that is different form the first frequency or frequency range, such as has been discussed above in detail.

Furthermore, or as an alternative to control device CD1, gas spring and gas damper assembly AS3 can, optionally, include one or more control devices operatively associated with damper reservoir 1034A. In the arrangement shown, for example, a control device in the form of a throttle element or port 1058 can extend through cover wall portion 1032 such that pressurized gas transfer can occur between spring chamber 202 and damper reservoir 1034A. Depending upon the size, shape and/or configuration of port 1058, pressurized gas damping of vibrations at a second (or third) predetermined frequency or across a second (or third) predetermined range of frequencies that differ from the first frequency or frequency range can be provided.

Figure 14:
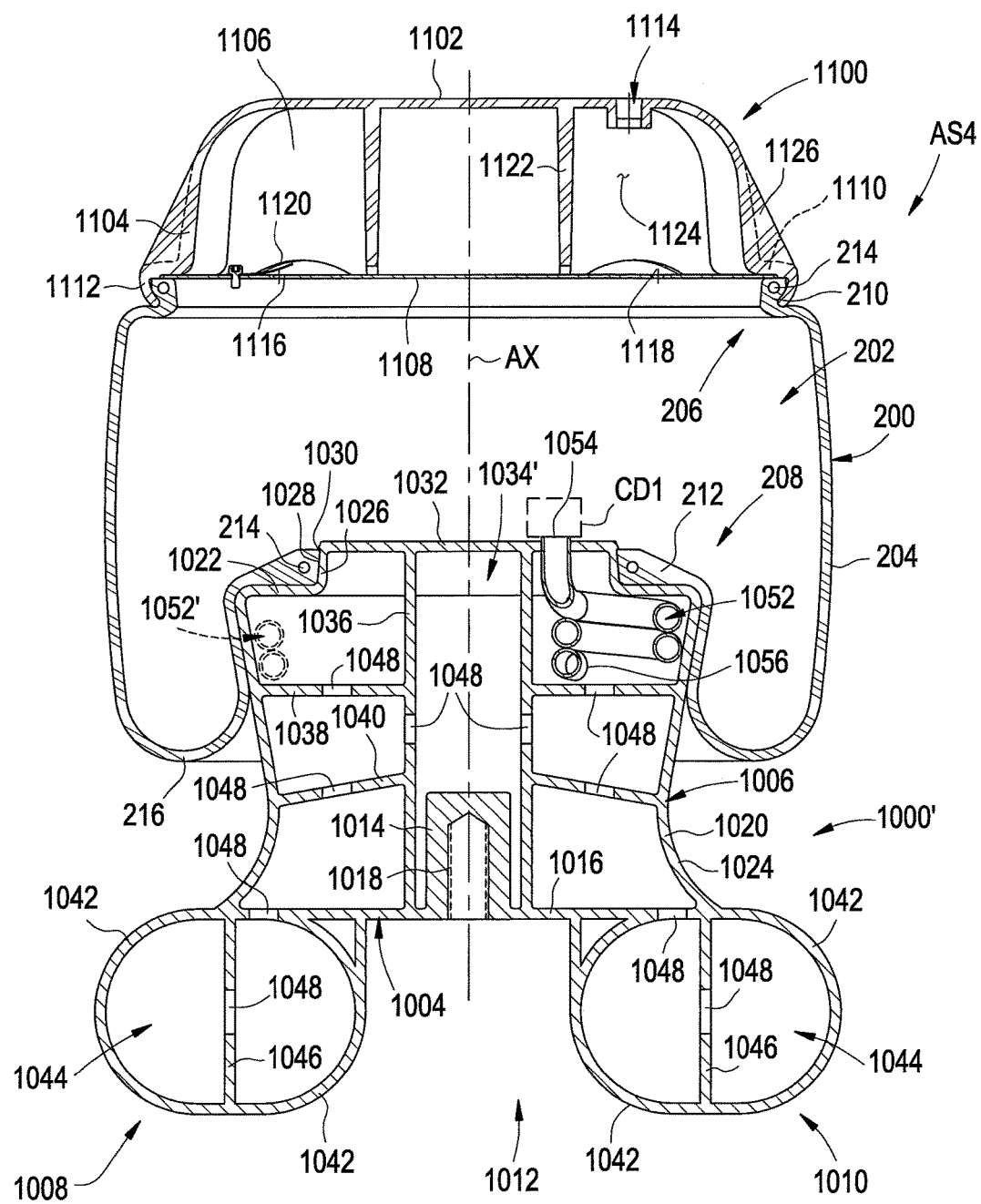
FIG. 14 is a cross-sectional side view of the gas spring and gas damper assembly in FIG. 13 taken from along a line similar to line 12-12 in FIG. 11.

Still another example of a gas spring and gas damper assembly AS4 in accordance with the subject matter of the present disclosure, such as may be suitable for use as gas spring and gas damper assemblies 102, for example, is shown in FIGS. 13 and 14. Gas spring and gas damper assembly AS4 can have a longitudinally-extending axis AX and can include one or more end members, such as an end member 1100 and an end member 1000' that is spaced longitudinally from end member 1100. It will be appreciated that end member 1000' is substantially similar to end member 1000 shown and described herein in connection with FIGS. 10-12. Additionally, flexible spring member 200 can extend peripherally around axis AX and can be secured between the end members in a substantially fluid-tight manner such that spring chamber 202 (FIG. 14) is at least partially defined therebetween.

Gas spring and gas damper assembly AS4 can be disposed between associated sprung and unsprung masses of an associated vehicle in any suitable manner, such as has been described above in connection with end members 300, 400, 800, 900 and/or 1000. As such, a further description of the operative connection of end members 1100 and 1000' to upper and lower structural components USC and LSC is not repeated here. However, it is to be recognized and understood that the foregoing descriptions as well as the features, components, construction and materials thereof are equally applicable to the arrangement shown in FIGS. 13 and 14.

Additionally, flexible spring member 200 has been described above in detail. Accordingly, a description of flexible spring member 200 is not repeated here. However, it is to be recognized and understood that the foregoing description of flexible spring member as well as the features, components, construction and materials thereof is equally applicable to the arrangement shown in FIGS. 13 and 14.

End member 1000' differs from end member 1000 that is described above in that partition wall 1050 of end member 1000 is omitted from end member 1000'. As such, damper reservoir 1034' of end member 1000' is not separated into damper reservoir portions (i.e., damper reservoir portions 1034A and 1034B) as was described in connection with end member 1000. As such, all the chambers of damper reservoir 1034' as well as reservoir extension volumes 1044' are disposed in fluid communication with one another. Additionally, in a preferred arrangement, ports 1048 are preferably of sufficient size, shape and/or configuration to permit the chambers of damper reservoir 1034' to form a substantially contiguous volume.

As indicated above, a gas spring and gas damper assembly in accordance with the subject matter of the present disclosure can include one or more elongated gas damping passages fluidically connected between the spring chamber and one or more gas damper reservoirs. Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermined range of frequencies.

It will be appreciated that the one or more elongated gas damping passages can be provided in any suitable manner and through the use of any suitable combination of one or more features, elements and/or components. For example, gas spring and gas damper assembly AS4 is shown in FIG. 14 as including an elongated gas damping passage 1052 that is at least substantially-entirely disposed within gas damper reservoir 1034', and extends between a passage end 1054 disposed in fluid communication with spring chamber 202 and a passage end 1056 disposed in fluid communication with gas damper reservoir 1034'. The detailed description presented above of elongated gas damping passages 324 and 444 as well as the construction, connections and operation thereof are equally applicable to passage 1052 in FIG. 14. It will be appreciated, however, that passage 1054 can be operative to generate pressurized gas damping of vibrations at a first predetermined frequency or across a first predetermined range of frequencies, such as has been discussed above in detail. Additionally, in that gas damper reservoir 1034' is greater in size relative to gas damper reservoir 1034 in FIG. 12, an elongated gas damping passage 1052' can alternately be used that includes one or more coils or loops that extend through a larger radius or have a larger diameter than the corresponding coils or loops of passage 1052. Furthermore, in that all of the chambers of gas damper reservoir 1034' are disposed in fluid communication with passage 1052, port 1058 of end member 1000 can, optionally, be omitted and is not shown in FIG. 14.

Gas spring and gas damper assembly AS4 can, optionally, include one or more flow control systems that are operatively connected between the spring chamber and one of the one or more pressurized gas volumes, pressurized gas reservoirs and/or other pressurized gas chambers. For example, a control device CD1 can be connected in fluid communication along passage 1052 or 1052', such as along passage end 1054, along passage end 1056 and/or in an intermediate position between ends 1054 and 1056. It will be appreciated that any suitable type, kind and/or combination of control devices can be used, such as one or more of control devices 500, 600 and/or 700, such as have been described above, for example. If provided, control device CD1 can be operative to generate pressurized gas damping of vibrations at a second predetermined frequency or across a second predetermined range of frequencies that is different form the first frequency or frequency range, such as has been discussed above in detail.

Furthermore, or as an alternative to control device CD1, gas spring and gas damper assembly AS4 can, optionally, include a second gas damping reservoir that is at least partially formed by end member 1100. It will be appreciated that any suitable configuration, construction and/or arrangement of components can be used. As one example, end member 1100 is shown in FIGS. 13 and 14 as including an end wall (or wall portion) 1102 and a side wall (or wall portion) 1104 that extends axially from along end wall 1102 in a direction toward end member 1000'. End wall 1102 and side wall 1104 together at least partially define a reservoir or chamber 1106 within end member 1100. A partition wall 1108 can extend across the end member and can be supported along a distal end of side wall 1104 to further define gas damper reservoir 1106. In some cases, side wall 1104 can terminate at or along an end wall portion 1110 and, if provided, partition wall 1108 can be supported on end member 1100 on or along end wall portion 1110.

End member 1100 can be secured on or along end 206 of flexible wall 204 in any suitable manner. As one example, an outer peripheral wall portion 1112 can be crimped or otherwise deformed around at least a portion of mounting bead 210 such that a substantially fluid-tight seal is formed therebetween. In the arrangement shown, such a configuration can also capture and at least partially retain partition wall 1108 on or along side wall 1104 and/or end wall portion 1110, such as by capturing the outer peripheral edge of the partition wall between mounting bead 210 and end wall portion 1110, for example. It will be appreciated, however, that other configurations and/or arrangements could alternately be used.

Gas spring and gas damper assembly AS4 can be in fluid communication with a suitable pressurized gas system (e.g., pressurized gas system 104) in any suitable manner. As one example, end member 1100 can include a pressurized gas transfer passage 1114 extending through end wall 1102 in fluid communication with at least damping reservoir 1106.

Additionally, it will be appreciated that damping reservoir 1106 can be disposed in fluid communication with spring chamber 202 in any suitable manner, such as by way of one or more ports or passages 1116 and/or 1118 that extend through partition wall 1108, for example. As discussed above, gas spring and gas damper assembly AS4 can, optionally, include one or more flow control systems that are operatively connected between the spring chamber and one of the one or more pressurized gas volumes, pressurized gas reservoirs and/or other pressurized gas chambers. For example, a control device 1120, which is shown as taking the form of a flap valve, can be disposed in fluid communication along one or more of passages 1116 and/or 1118. In such cases, the passages and control device can be cooperative to generate pressurized gas damping of vibrations at a predetermined frequency or across a predetermined range of frequencies. In a preferred arrangement, the predetermined frequency or frequency range will be different form the first frequency or frequency range associated with elongated gas damping passage 1052 and/or 1052', such as has been discussed above in detail.

It will be appreciated that end member 1100 can include any suitable number of one or more additional features, components and/or elements. For example, a central support wall 1122 can extend from along end wall 1102 toward partition wall 1108 and can, in some cases abuttingly engage the partition wall, such as may substantially inhibit deflection of the partition wall into damping reservoir 1106. In some cases, end member 1100 can include one or more inner support walls 1124, such as may extend between and operatively interconnect central support wall 1122 and side wall 1104, for example. Additionally, or in the alternative, end member 1100 can include one or more outer support walls 1126, such as may extend between and operatively interconnect side wall 1104 and end wall portion 1110, for example. In some cases, one or more gaps or spaces (not numbered) can be provided between partition wall 1108 and one or more of inner support walls 1124 and/or central support wall 1122, such as may permit different sections or chambers of damping reservoir 1106 for function as a substantially contiguous volume.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and gas damper assembly comprising:
   a flexible spring member having a longitudinal axis and extending longitudinally between opposing first and second ends to at least partially define a spring chamber therebetween;
   a first end member secured across said first end of said flexible spring member such that a substantially fluid-tight seal is formed therebetween; and,
   a second end member spaced longitudinally from said first end member and secured across said second end of said flexible spring member such that a substantially fluid-tight seal is formed therebetween, said second end member including a base section and a shell section, said base section including a base end wall portion oriented transverse to said longitudinal axis and a base side wall portion extending peripherally about said longitudinal axis and axially from along said base end wall portion toward said first end member such that:

a first damper reservoir having a substantially-fixed volume is at least partially defined by said base section, said shell section including a shell end wall portion oriented transverse to said longitudinal axis and a shell side wall portion extending peripherally about said longitudinal axis and axially from along said shell end wall portion in a direction toward said base end wall portion of said base section, said base section and said shell section interengaged with one another such that at least some of said base side wall portion and said shell side wall portion are axially coextensive with one another with said first damper reservoir disposed between said base end wall portion and said shell end wall portion; and, an elongated gas damping passage is formed between said base side wall portion and said shell side wall portion, said elongated gas damping passage extending peripherally about said axis and arranged such that said elongated gas damping passage forms at least a portion of at least one helical coil, said elongated gas damping passage fluidically connected between said spring chamber and said first damper reservoir such that said elongated gas damping passage is operative to generate pressurized gas damping of vibrations across a predetermined range of frequencies.

2. A gas spring and gas damper assembly according to claim 1, wherein said second end member includes a passage port extending through said base section placing said elongated gas damping passage in fluid communication with said first damper reservoir.

3. A gas spring and gas damper assembly according to claim 1, wherein said second end member includes a passage port extending through said shell section placing said elongated gas damping passage in fluid communication with said spring chamber.

4. A gas spring and gas damper assembly according to claim 1, wherein said elongated gas damping passage has a passage length and a passage maximum cross-sectional dimension with a ratio of said passage length to said passage maximum cross-sectional dimension of at least 10:1.

5. A gas spring and gas damper assembly according to claim 1, wherein said elongated gas damping passage has a passage length and a passage maximum cross-sectional dimension with a ratio of said passage length to said passage maximum cross-sectional dimension of at least 20:1.

6. A gas spring and gas damper assembly according to claim 1, wherein said elongated gas damping passage has a passage length and a passage maximum cross-sectional dimension with a ratio of said passage length to said passage maximum cross-sectional dimension of at least 50:1.

7. A gas spring and gas damper assembly according to claim 1 further comprising a control device disposed in fluid communication along said elongated gas damping passage and in series therewith, said control device operative to alter pressurized gas flow through said elongated gas damping passage under one or more conditions of use.

8. A gas spring and gas damper assembly according to claim 7, wherein said control device is operative to generate pressurized gas damping of vibrations across a second predetermined range of frequencies.

9. A gas spring and gas damper assembly according to claim 1, wherein said second end member includes an outside surface along which a rolling lobe of said flexible spring member is formed.

10. A gas spring and gas damper assembly according to claim 1 further comprising a sealing element operatively disposed between said base section and said shell section of said second end member such that a substantially fluid-tight seal is formed therebetween.

11. A gas spring and gas damper assembly comprising:
a flexible spring member having a longitudinal axis and extending longitudinally between opposing first and second ends to at least partially define a spring chamber therebetween;

a first end member secured across said first end of said flexible spring member such that a substantially fluid-tight seal is formed therebetween; and, a second end member spaced longitudinally from said first end member and secured across said second end of said flexible spring member such that a substantially fluid-tight seal is formed therebetween, said second end member including a base section and a shell section, said base section including a base end wall portion oriented transverse to said longitudinal axis and a base side wall portion extending peripherally about said longitudinal axis and axially from along said base end wall portion toward said first end member such that:

a first damper reservoir having a substantially-fixed volume is at least partially defined by said base section, said shell section including a shell end wall portion oriented transverse to said longitudinal axis and a shell side wall portion extending peripherally about said longitudinal axis and axially from along said shell end wall portion in a direction toward said base end wall portion of said base section, said base section and said shell section interengaged with one another such that at least some of said base side wall portion and said shell side wall portion are axially coextensive with one another with said first damper reservoir disposed between said base end wall portion and said shell end wall portion; and, an elongated gas damping passage is formed between said base side wall portion and said shell side wall portion, said elongated gas damping passage fluidically connected between said spring chamber and said first damper reservoir such that said elongated gas damping passage is operative to generate pressurized gas damping of vibrations across a predetermined range of frequencies with at least one of said base side wall portion and said shell side wall portion including an elongated helical groove extending therealong that at least partially defines said elongated gas damping passage.

12. A gas spring and gas damper assembly according to claim 11, wherein said base side wall portion includes a base elongated helical groove extending therealong and said shell side wall portion includes a shell elongated helical groove extending therealong with said base section and said shell section positioned relative to one another such that said base and shell elongated helical grooves at least partially define said elongated gas damping passage.

13. A gas spring and gas damper assembly according to claim 11, wherein said second end member includes a passage port extending through said base section placing said elongated gas damping passage in fluid communication with said first damper reservoir.

14. A gas spring and gas damper assembly according to claim 11, wherein said second end member includes a passage port extending through said shell section placing said elongated gas damping passage in fluid communication with said spring chamber.

15. A gas spring end member dimensioned for securement to an associated flexible spring member, said gas spring end member having a longitudinal axis and comprising:
- a base section including a base end wall portion oriented transverse to said longitudinal axis and a base side wall portion extending peripherally about said longitudinal axis and axially from along said base end wall portion such that a first damper reservoir having a substantially-fixed volume is at least partially defined by said base section;
- a shell section including a shell end wall portion oriented transverse to said longitudinal axis and a shell side wall portion extending peripherally about said longitudinal axis and axially from along said shell end wall portion in a direction toward said base end wall portion of said base section, said base section and said shell section interengaged with one another such that at least some of said base side wall portion and said shell side wall portion are axially coextensive with one another with said first damper reservoir disposed between said base end wall portion and said shell end wall portion; and,
- an elongated gas damping passage formed between said base side wall portion and said shell side wall portion, said elongated gas damping passage fluidically connected with said first damper reservoir, and said elongated gas damping passage extending peripherally about said axis and arranged such that said elongated gas damping passage forms at least a portion of at least one helical coil.

16. A gas spring end member according to claim 15, wherein said base section includes a base section port disposed in fluid communication with one end of said elongated gas damping passage, and said shell section includes a shell section port disposed in fluid communication with an opposing end of said elongated gas damping passage.

17. A gas spring end member according to claim 15, wherein said elongated gas damping passage has a passage length and a passage maximum cross-sectional dimension with a ratio of said passage length to said passage maximum cross-sectional dimension of at least 10:1.

18. A gas spring end member according to claim 15, wherein at least one of said base side wall portion and said shell side wall portion includes an elongated helical groove extending therealong that at least partially defines said elongated gas damping passage.

19. A gas spring end member according to claim 18, wherein said base side wall portion includes a base elongated helical groove extending therealong and said shell side wall portion includes a shell elongated helical groove extending therealong with said base section and said shell section positioned relative to one another such that said base and shell elongated helical grooves at least partially define said elongated gas damping passage.

20. A gas spring end member according to claim 15 further comprising a sealing element operatively disposed between said base section and said shell section such that a substantially fluid-tight seal is formed therebetween.

* * * * *